(12) United States Patent
Morino et al.

(10) Patent No.: US 7,891,240 B2
(45) Date of Patent: Feb. 22, 2011

(54) THERMAL TYPE FLOW MEASURING DEVICE

(75) Inventors: Takeshi Morino, Hitachinaka (JP); Yuki Okamoto, Hitachinaka (JP); Taiji Shoyama, Detroit, MI (US); Masayuki Hio, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 12/708,473

(22) Filed: Feb. 18, 2010

(65) Prior Publication Data

US 2010/0242589 A1    Sep. 30, 2010

(30) Foreign Application Priority Data

Mar. 31, 2009  (JP)  ............... 2009-083970
Sep. 30, 2009  (JP)  ............... 2009-225945

(51) Int. Cl.
*G01F 1/68* (2006.01)
(52) U.S. Cl. .................................. 73/202.5
(58) Field of Classification Search ............... 73/204.23, 73/204.25, 204.26
See application file for complete search history.

(56) References Cited

U.S. PATENT DOCUMENTS

| | | | |
|---|---|---|---|
| 6,332,356 B1 | 12/2001 | Hecht et al. | |
| 6,983,653 B2 * | 1/2006 | Iwaki et al. | ............... 73/204.23 |
| 7,059,184 B2 * | 6/2006 | Kanouda et al. | ........... 73/202.5 |

FOREIGN PATENT DOCUMENTS

| | | | |
|---|---|---|---|
| EP | 1 939 539 A2 | 7/2008 |
| EP | 2 056 076 A1 | 5/2009 |
| JP | 2002-506528 A | 2/2002 |
| JP | 2003 177045 A | 6/2003 |
| JP | 2004-226315 A | 8/2004 |

OTHER PUBLICATIONS

European Patent Office Action dated Jul. 30, 2010 (3 pages).

* cited by examiner

*Primary Examiner*—Jewel Thompson
(74) *Attorney, Agent, or Firm*—Crowell & Moring LLP

(57) ABSTRACT

A first sub passage portion and a second sub passage portion are configured so as to form layers on both sides of a separation wall, respectively. A linear passage portion of a third sub passage portion is formed so that a cross section thereof extends within a range across both sides of the separation wall in a direction perpendicular to a wall surface of the separation wall. The cross section is taken along a direction perpendicular to a flow direction of a fluid flowing through the linear passage portion. The separation wall separates the layer of the first sub passage portion and the layer of the second sub passage portion from each other. A first communication passage portion which allows the first sub passage portion to communicate with the third sub passage portion curves to make a directional change and connects a passage wall surface of the first sub passage portion to a side wall of the third sub passage portion by an inclined surface. The passage wall surface is defined by the separation wall. The side wall is located on a side of the second sub passage portion with respect to the separation wall. A through passage which passes through the separation wall is provided in a second communication passage portion which allows the second sub passage portion to communicate with the third sub passage portion.

21 Claims, 17 Drawing Sheets

THERMAL TYPE FLOW MEASURING DEVICE

TECHNICAL FIELD

The present invention relates to a thermal type flow measuring device which detects the flow rate of a fluid, and in particular, to a bypass, thermal type flow measuring device which measures the flow rate of a fluid flowing through a sub passage which takes in a portion of a fluid flowing through a main passage.

BACKGROUND ART

A bypass, thermal type flow measuring device has a sub passage which takes in a portion of a fluid flowing through a main passage, and has a sensor element disposed in the sub passage to thereby measure the flow rate of the fluid flowing through the sub passage.

When such bypass, thermal type flow measuring device is employed as an intake air flow measuring device of an internal combustion engine system, measurement of backflow, which is generated in an intake pipe, is desired to be accurate. For this reason, the sub passage needs to have a shape to take in the backflow efficiently, and thus, in some bypass, thermal type flow measuring devices, a sub passage has an outflow opening plane (outlet) opening on a perpendicular plane (orthogonal plane) to the flow (backflow) in the main passage, similarly to an inflow opening plane (inlet).

As such bypass, thermal type flow measuring device, there is known a device (for example, see FIG. 4 of Patent Literature 1) in which a sub passage includes: a curved first section; a measurement passage which is provided to continue with a region on an inner side (inner peripheral side) of the first section and in which a sensor element (measuring element) is disposed; and a bypass passage which is provided in a region on an outer side (outer peripheral side) of the first section and which bypasses the sensor element.

In this device, in the curved first section, soil substances (liquid droplet, oil droplet) which soil the sensor element, and dust and the like (solid particles) which has a high risk of breaking the sensor element are pushed away to a region on the outer side (outer peripheral side) of the first section by an inertial force (centrifugal force). The soil substances, and dust and the like are caused to flow through the bypass passage continuing with this region and thus not to flow through the measurement passage.

In the above-mentioned device, the sub passage forms a loop making an angle of 360 degrees. In the case where an inflow opening plane (inlet) and an outflow opening plane (outlet) of the sub passage each open on a perpendicular plane (orthogonal plane) to the flow (backflow) in the main passage, the entire sub passage cannot be formed on the same plane.

There is known a thermal type flow measuring device (for example, see FIGS. 2, 4, and 9 of Patent Literature 2) in which a spiral sub passage winding not less than 360 degrees is formed to have a layered structure on two planes in parallel relationship.

In this thermal type flow measuring device, the sub passage includes: a first sub passage provided on a first virtual plane A and winding spirally with no intersection; a second sub passage provided on the second virtual plane B in parallel relationship to the first virtual plane A with a predetermined offset value; and a third sub passage extending between the first virtual plane A and the second virtual plane B and communicatively connecting the first sub passage and the second sub passage. Then, by disposing a sensor element at some midpoint in the first spiral sub passage winding not less than 360 degrees, the sensor element is protected from incoming water drop and soil substances.

CITATION LIST

Patent Literature

[Patent Literature] 1 Published Japanese Translation of PCT International Application No. 2002-506528

[Patent Literature] 2 Japanese Patent Application Publication No. 2004-226315

SUMMARY OF INVENTION

Technical Problems

It is desirable for a thermal type flow measuring device to have a smaller dimension (thickness dimension) in a perpendicular direction to the flow direction of a fluid to be measured. In other words, it is desirable for the device to have a thin shape.

In the device in Patent Literature 2, the first sub passage and the second sub passage are configured so as to form layers respectively on the first virtual plane A and the second virtual plane B in parallel relationship to each other with a predetermined offset value. The direction in which the layers are stacked in the layered structure is perpendicular direction to the flow direction of the fluid to be measured. Therefore, the width of the first sub passage and the width of the second sub passage in the direction in which the layers are stacked in the layered structure are factors to determine the thickness direction dimension of the thermal type flow measuring device. Moreover, in the thermal type flow measuring device, since the sensor element is disposed in the first sub passage, the first sub passage needs to be provided on a circuit board on which the sensor element is mounted, as well as to have a sufficient passage sectional area allowing a flow rate required for the measurement of the fluid. This increases the thickness direction dimension of the first sub passage, causing an increase in the thickness direction dimension of the entire sub passage.

A circuit board on which the sensor element is mounted is disposed at such a position that the opposite surface (back surface) of the circuit board to the surface thereof on which the sensor element is mounted is nearly in contact with a wall surface of the first sub passage. This secures a large passage cross section above the sensor element, which in turn secures a sufficient flow rate. With this structure, however, soil substances (liquid droplet, oil droplet) and the dust and the like (solid particles) which cannot be removed despite the effect of the curved passage of the first sub passage flow above the sensor element. Thus, the protection of the sensor element may not be sufficient.

With disposition of the sensor element on a curved portion, the flow may be deviated, and thus improvement in flow measurement accuracy may be limited.

The device in Patent Literature 1 likewise has the above-mentioned problems.

Solution to Problems

It is the first object of the present invention to provide a thermal type flow measuring device which has a curved sub passage and a small thickness direction dimension. It is the second object of the present invention to provide a thermal type flow measuring device which has a curved sub passage to reduce soil substances and dust and the like which adhere to or collide with the sensor element, thereby improving protection for the sensor element against the soil substances and dust and the like which cannot be removed in the curved sub passage. It is the third object of the present invention to provide a thermal type flow measuring device which has a curved sub passage and allows less deviated flow for the sensor element, thereby providing improved flow measurement accuracy.

To achieve the above-mentioned first object, a thermal type flow measuring device of the present invention includes: a sub passage which takes in a portion of a fluid flowing through a main passage; and a sensor element disposed in the sub passage to thereby detect a flow rate of the portion of the fluid. The sub passage has: a first sub passage portion formed in a front surface side of a plate-shaped member and curving with no intersection; a second sub passage portion formed on a back surface side of the plate-shaped member and curving with no intersection; and a third sub passage portion formed as an opening which passes through from the front surface side to the back surface side of the plate-shaped member. The first sub passage portion is communicatively connected to one end of the third sub passage portion in a direction along a plate surface of the plate-shaped member. The second sub passage portion is communicatively connected to the other end of the third sub passage portion in the direction along the plate surface of the plate-shaped member. The sensor element is disposed in the third sub passage portion.

Here, it is preferable that: the sensor element be mounted on a front surface side of a plate-shaped circuit board; and that the plate-shaped circuit board be disposed on a portion, located on the back surface side of the plate-shaped member, in the third sub passage portion, and be attached in such a manner that a back surface of the plate-shaped circuit board faces a side of a portion, located on the front surface side of the plate-shaped member, in the third sub passage portion.

It is preferable that a sectional area of a passage formed on a side of one passage wall surface of the third sub passage portion be smaller than a sectional area of a passage formed on a side of a different passage wall surface of the third sub passage portion, the one passage wall surface facing an element surface of the sensor element, the different passage wall surface facing the back surface of the plate-shaped circuit board.

It is preferable that a passage gap formed between one passage wall surface of the third sub passage portion and an element surface of the sensor element be smaller than a passage gap formed between a different passage wall surface of the third sub passage portion and the back surface of the plate-shaped circuit board, the one passage wall surface facing the element surface, the different passage wall surface facing the back surface.

It is preferable that: the third sub passage portion have a passage portion extending across the front surface side and the back surface side of the plate-shaped member and also extending linearly along a front surface and a back surface of the plate-shaped member; and the sensor element be disposed in the passage portion extending linearly.

It is preferable that: the sub passage be formed by a first plate-shaped member being the plate-shaped member, a second plate-shaped member provided on the front surface side of the first plate-shaped member, and a third plate-shaped member provided on the back surface side of the first plate-shaped member; in the first plate-shaped member, there be formed a side wall of the first sub passage portion on a front surface of the first plate-shaped member, a side wall of the second sub passage portion on a back surface of the first plate-shaped member, and a side wall of the third sub passage portion at a position offset from the back surface in a direction opposite to a direction in which the front surface side faces; in the second plate-shaped member, there be formed a side wall facing the side wall formed in the first sub passage portion, and a side wall of the third sub passage portion facing the side wall of the third sub passage portion formed in the first plate-shaped member with the plate-shaped circuit board in between; and in the third plate-shaped member, there be formed a side wall facing the side wall formed in the second sub passage portion. It is preferable that the first sub passage portion be formed in a roundabout shape curving not less than 100 degrees with no intersection and provided on the front surface side of the plate-shaped member.

It is preferable that a continuous joined shape of the first, second, and third sub passage portions wind not less than 360 degrees.

To achieve the above-mentioned object, a thermal type flow measuring device of the present invention includes: a sub passage which takes in a portion of a fluid flowing through a main passage; and a sensor element disposed in the sub passage to thereby detect a flow rate of the portion of the fluid. The sub passage has a first sub passage portion formed so as to curve with no intersection, a second sub passage portion formed so as to curve with no intersection, and a third sub passage portion provided between the first sub passage portion and the second sub passage portion. The first sub passage portion and the second sub passage portion are configured so as to form layers on both sides of a separation wall, respectively. The third sub passage portion has a linear passage portion. The linear passage portion of the third sub passage portion is formed so that a cross section thereof extends within a range across both sides of the separation wall in a direction perpendicular to a wall surface of the separation wall. The cross section is taken along a direction perpendicular to a flow direction of a fluid flowing through the linear passage portion. The separation wall separates the layer of the first sub passage portion and the layer of the second sub passage portion from each other. A first communication passage portion which allows the first sub passage portion to communicate with the third sub passage portion curves to make a directional change and connects a passage wall surface of the first sub passage portion to a side wall of the third sub passage portion by an inclined surface, the passage wall surface being defined by the separation wall, the side wall being located on a side of the second sub passage portion with respect to the separation wall. A through passage which passes through the separation wall is provided in a second communication passage portion which allows the second sub passage portion to communicate with the third sub passage portion. The sensor element is disposed in the third sub passage portion.

Here, it is preferable that the thermal type flow measuring device further include: a housing member including portions of the first sub passage portion, the second sub passage portion, the third sub passage portion, the first communication passage portion, and the second communication passage portion; a base member including portions of the first sub passage portion, the third sub passage portion, the first communication passage portion, and the second communication passage portion; and a cover member including portions of the second sub passage portion and the second communication passage portion. Also, it is preferable that the base member be joined to one surface of the housing member and the cover member is jointed to the other surface of the housing member, so that a sub passage is assembled, the sub passage having the first sub passage portion, the second sub passage portion, the third sub passage portion, the first communication passage portion, and the second communication passage portion.

According to the above-mentioned configuration, the thickness direction dimension of the third sub passage portion can be made greater, and thus a fluid passage can be formed not only above the sensor element, but also below the sensor element. This makes it easier to implement a passage structure which allows soil substances and dust and the like to flow below the sensor element, whereby the above-mentioned second object can be achieved.

It is preferable that each of the housing member, the base member, and the cover member be formed of a resin molded member.

To achieve the above-mentioned object, it is preferable that: the sensor element be mounted on a plate-shaped circuit board; and the circuit board is disposed so that the sensor element is located in the linear passage portion of the third sub passage portion.

It is preferable that: the sensor element be mounted on a plate-shaped circuit board; the circuit board be disposed so that the sensor element is located at the linear passage portion of the third sub passage portion; and an opposite surface of the circuit board to a surface thereof on which the sensor element is mounted be fixed to the base member.

It is preferable that: the third sub passage portion have a first projecting portion formed in the housing member, and a second projecting portion formed in the base member; the first projecting portion face a surface of the sensor element; and the second projecting portion face the opposite surface of the circuit board to the surface thereof on which the sensor element is mounted.

It is preferable that a sectional area of a passage formed between the first projecting portion and the surface of the circuit board on which the sensor element is mounted be smaller than a sectional area of a passage formed between the second projecting portion and the opposite surface of the circuit board to the surface thereof on which the sensor element is mounted, both of the sectional areas being taken along the direction perpendicular to the flow direction of the fluid.

It is preferable that: the first sub passage portion have an inlet opening plane perpendicular to a flow direction of a main fluid; the second sub passage portion have an outlet opening plane perpendicular to the flow direction of the main fluid; and a sub passage from the inlet opening plane to the outlet opening plane curve not less than 360 degrees to make a directional change.

It is preferable that the outlet opening plane be located closer to the inlet opening plane than a downstream end surface of the housing member is, the downstream end surface being downstream in the flow direction of the main fluid.

It is preferable that in the first sub passage portion, a jagged shape be formed at least on a wall surface in a range of projection from the inlet opening plane.

It is preferable that the jagged shape have at least one surface which forms an angle less than 90 degrees with a direction of the fluid.

It is preferable that a foreign matter contained in a fluid having entered the first sub passage portion collide with the jagged shapes at least twice, and then be contained again in the fluid in the first sub passage portion.

It is preferable that in resin molding of a member constituting the first sub passage portion, the jagged shape be formed with a metallic mold that is subjected to satin-like finish.

ADVANTAGEOUS EFFECT OF INVENTION

According to the present invention, it is possible to provide a thermal type flow measuring device which has a curved sub passage and a small thickness direction dimension by including the following configurations. A first sub passage portion and a second sub passage portion are configured so as to form layers on both sides of a separation wall, respectively. A linear passage portion of a third sub passage portion is formed so that a cross section thereof extends within a range across both sides of the separation wall in a direction perpendicular to a wall surface of the separation wall. The cross section is taken along a direction perpendicular to a flow direction of a fluid flowing through the linear passage portion. The separation wall separates the layer of the first sub passage portion and the layer of the second sub passage portion from each other. A first communication passage portion which allows the first sub passage portion to communicate with the third sub passage portion curves to make a directional change and connects a passage wall surface of the first sub passage portion to a side wall of the third sub passage portion by an inclined surface. The passage wall surface is defined by the separation wall. The side wall is located on a side of the second sub passage portion with respect to the separation wall. A through passage which passes through the separation wall is provided in a second communication passage portion which allows the second sub passage portion to communicate with the third sub passage portion.

By increasing the thickness direction dimension of the third sub passage portion with the above-mentioned configuration, it is possible to provide a thermal type flow measuring device which has improved protection for the sensor element against soil substances and dust and the like which cannot be removed in the curved sub passage.

By disposing the sensor element in the linear passage portion of the third sub passage portion, it is possible to provide a thermal type flow measuring device with less deviation in the flow to the sensor element and improved accuracy of measurement.

DESCRIPTION OF EMBODIMENTS

Embodiments of the present invention are described below with reference to the drawings. In the following description, the thickness dimension or the thickness direction dimension is along a direction in which layers in a sub passage are stacked to form a layered structure, and the surface of a sensor element is parallel to the layers so formed. Therefore, the thickness dimension and the thickness direction dimension are in accord with the dimension in a direction perpendicular to the sensor element surface. The direction perpendicular to the sensor element surface is in accord with a direction perpendicular to each of a direction in which the sub passage is inserted in the intake pipe and a direction in which fluid flows.

First Embodiment

Figure 1:
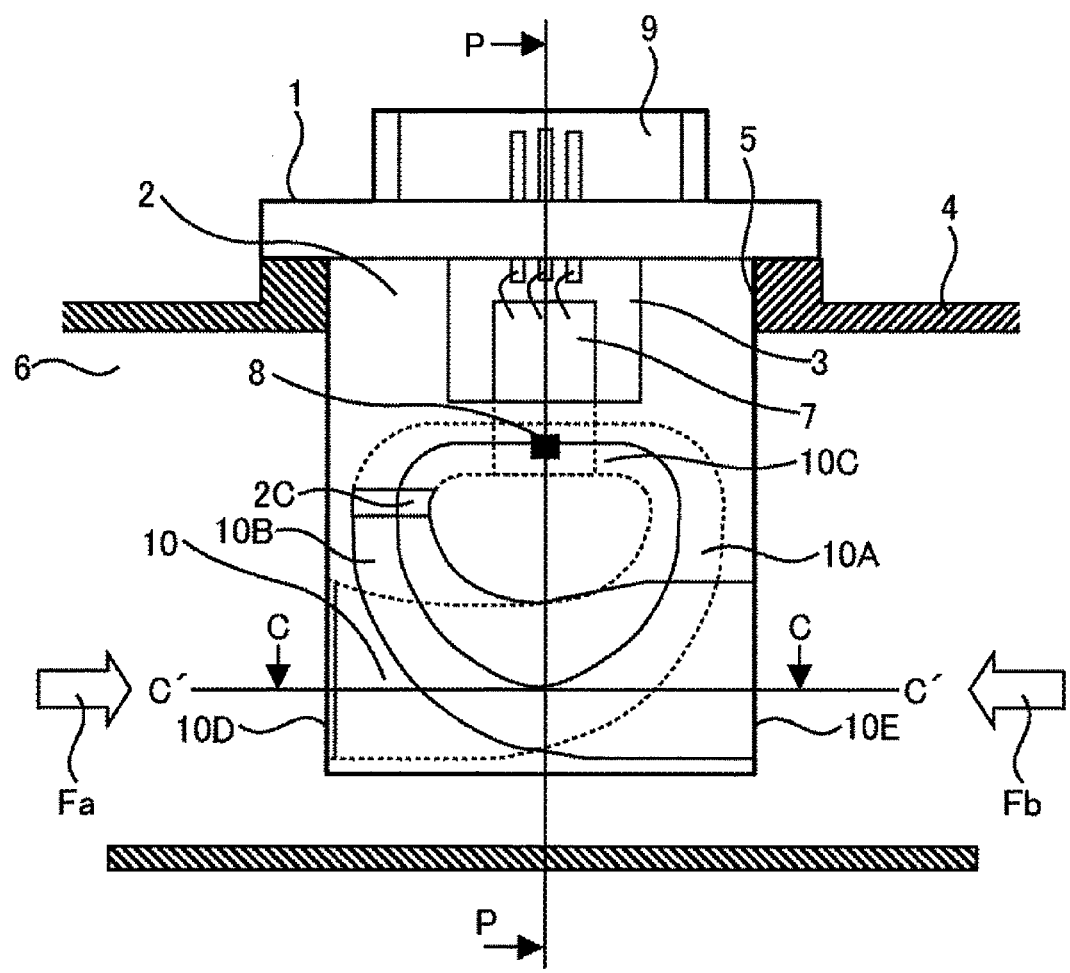
FIG. 1 is diagram showing one embodiment of a thermal type flow measuring device of the present invention.
Figure 2:
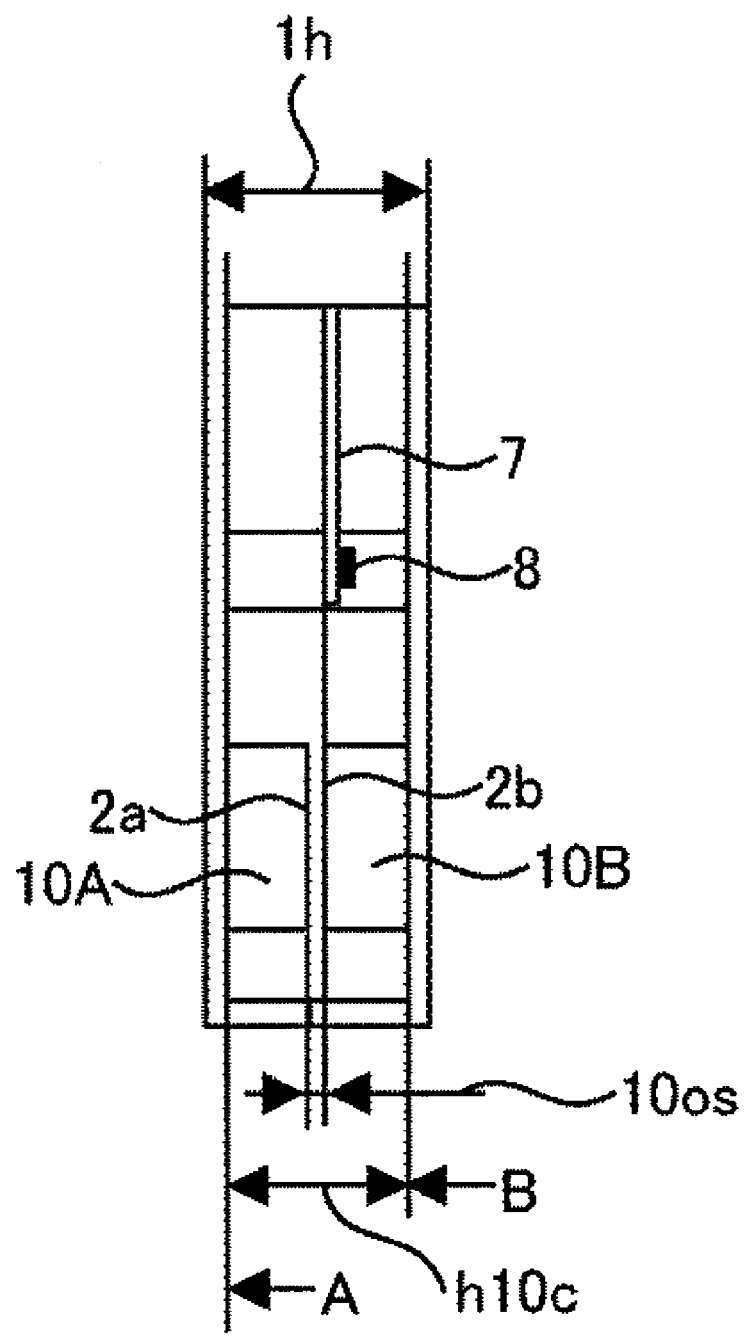
FIG. 2 is a cross-sectional view taken along the line P-P in FIG. 1.

FIGS. 1 and 2 each show a configuration of a thermal type flow measuring device according to the present invention. In particular, FIG. 1 is a cross-sectional view along the flow direction of fluid in an intake pipe in which the thermal type flow measuring device is disposed. FIG. 2 is a cross-sectional view of the thermal type flow measuring device taken along the line P-P in FIG. 1.

A thermal type flow measuring device 1 is an assembly formed of a housing member 2 made of molded resin, and a resin base member 20 (see FIG. 3) and a resin cover member 30 (see FIG. 3) which cover the housing member 2. The thermal type flow measuring device 1 is inserted through an insertion hole 5 formed in an intake pipe 4 with a lower portion of the thermal type flow measuring device 1 located inside a main passage 6 formed by the intake pipe 4.

On a plate-shaped circuit board 7, mounted are a circuit with electronic components and a sensor element 8 formed on a silicon substrate. The circuit board 7 is fixed to the housing member 2 so that one side thereof, on which the circuit is formed, would be housed in an electric chamber 3 and the other side thereof, on which the sensor element 8 is mounted, would be located in a third sub passage portion 10C of a sub passage 10. Also, a connector 9 having terminals for power supply and signal output is integrally formed with the housing member 2.

The sensor element 8 includes: a heating resistor formed on the silicon substrate; resistance temperature sensors which are formed on the silicon substrate at positions upstream and downstream of the heating resistor, and which detect the temperature of the fluid; and the like. The resistance temperature sensors located upstream and downstream of the heating resistor are used to detect fluid temperatures upstream and downstream thereof, respectively. On the circuit board 7, there are provided: a detection circuit to detect a fluid flow rate by detecting a difference in temperature between the upstream and downstream sides of the heating resistor from detected temperature values obtained by the resistance temperature sensors located upstream and downstream of the heating resistor; a correction circuit to correct a detected value of the detection value, i.e., a fluid flow rate value; and a control circuit to control the value of a current flowing through the heating resistor. The configuration of each resistance temperature sensor for detecting a fluid flow rate is not limited to the one described above, and other configurations may also be used.

The thermal type flow measuring device 1 has the sub passage 10 formed in its end portion in the insertion direction inside the main passage 6 (lower portion of FIG. 1). Forward flow fluid Fa and back flow fluid Fb flowing through the main passage 6 partially flow into the sub passage 10. Inside the sub passage 10, the sensor element 8 to measure a flow rate is disposed.

The sub passage 10 includes a first sub passage portion 10A, a second sub passage portion 10B, and the third sub passage portion 10C. The first sub passage portion 10A is provided on a first virtual plane A in the main passage 6 in a 1 h-thick inside space (see FIG. 2) of the thermal type flow measuring device 1, and has a curved portion (or bent portion) curving not less than 90 degrees to make a directional change with no intersection. The second sub passage portion 10B is provided on a second virtual plane B in a parallel relationship to the first virtual plane A with a predetermined offset value h of, and has a curved portion (or bent portion) curving not less than 90 degrees to make a directional change with no intersection. The third sub passage portion 10C is provided between the first virtual plane A and the second virtual plane B and extends linearly in a direction parallel to the first virtual plane A and the second virtual plane B so that the first sub passage portion 10A and the second sub passage portion 10B would be communicatively connected to each other.

Figure 3:
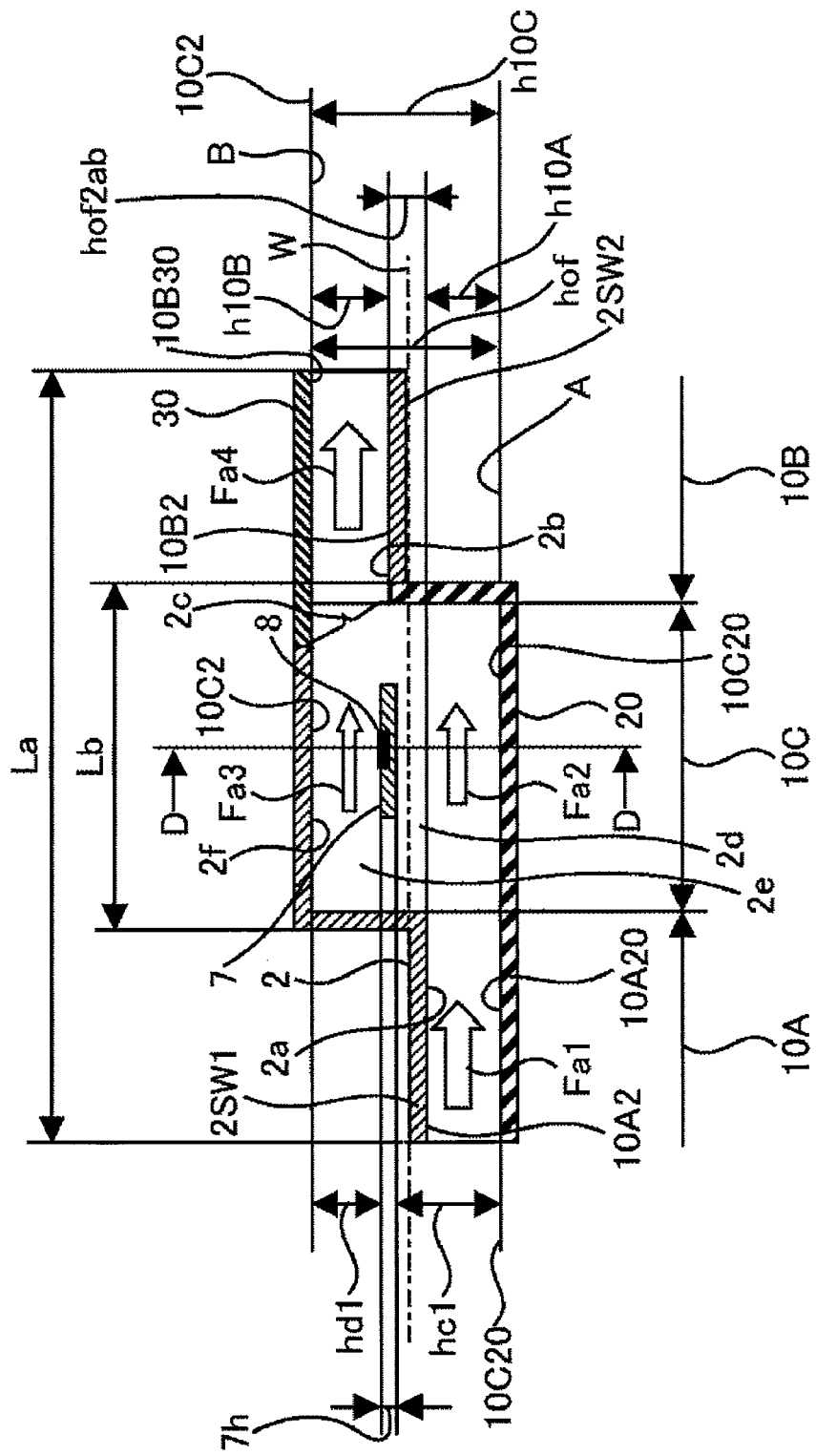
FIG. 3 is a diagram showing an arrangement of a sub passage and a circuit board of the one embodiment of the present invention.

In the sub passage 10 according to the above-mentioned configuration, the first sub passage portion 10A curving to make a directional change and the second sub passage portion 10B curving to make a directional change are disposed in such a manner as to have no intersection and to form layers respectively on two sides in a direction perpendicular to a separation plane W with the separation plane W in between, and the first and second sub passage portions 10A and 10B, which form the layered structure, communicate with each other by the third sub passage portion 10C (see FIGS. 1 and 3). The third sub passage portion 10C is formed so that a fluid flow cross section perpendicular to the direction of the fluid flowing through the third sub passage portion 10C would extend across the opposite sides of the separation plane W in the direction perpendicular to the separation plane W.

In FIG. 3, a first sub passage wall surface portion 2SW1 and a second sub passage wall surface portion 2SW2 of the housing member 2 are substantially integrally formed in the configuration of the sub passage 10 shown in FIG. 1. A linear passage portion of the third sub passage portion 10C is formed in such a manner that the cross section of the linear passage portion, taken along a direction perpendicular to the flow direction of the fluid flowing through the linear passage portion, extends within a range across both sides of a separation wall 2SW (2SW1, 2SW2) in a direction perpendicular to the separation wall 2SW. The separation wall 2SW separates the layer of the first sub passage portion 10A and the layer of the second sub passage portion 10B The first sub passage portion 10A and the second sub passage portion 10B are designed in such a manner that centrifugal force is used to push water, oil mist, and dust to outer peripheral sides of the first sub passage portion 10A and the second sub passage portion 10B so that the water, the oil mist, and the dust would bypass the sensor element 8. In this sense, the first sub passage portion 10A and the second sub passage portion 10B form a "bypass passage."

One end of the first sub passage portion 10A is open to the main passage 6 and forms an inlet 10D for the fluid, and the other end thereof is communicatively connected to one end of the second sub passage portion 10B via the third sub passage portion 10C. The other end of the second sub passage portion 10B is open to the main passage 6 and forms an outlet 10E for the fluid.

Both the first virtual plane A and the second virtual plane B are parallel to the fluid flow of the main passage 6, and the openings of the inlet 10D and the outlet 10E each open on a perpendicular plane to the fluid flow of the main passage 6.

The circuit board 7 is disposed in the third linear sub passage 10C, which communicatively connects the first sub passage portion 10A and the second sub passage portion 10B.

FIG. 3 is a cross-sectional view schematically showing a cross section taken along the line C-C in FIG. 1 and stretched linearly along the line C'-C' in FIG. 1. The forward flow fluid Fa flows from the inlet 10D into the first sub passage portion 10A, flows sequentially through the third sub passage portion 10C and the second sub passage portion 10B, and then flows out from the outlet 10E to the main passage 6.

The heights of the first sub passage portion 10A, the second sub passage portion 10B, and the third sub passage portion 10C are h10A, h10B, and h10C, respectively, and the offset value between the first sub passage portion 10A and the second sub passage portion 10B is hof.

The sub passage 10 is described more specifically with reference to FIG. 3.

The end side of the housing member 2 is provided with a plate-shaped portion, and therearound, the sub passage 10 is formed. The first sub passage portion 10A is formed in almost its entirety in a front surface 2a portion (front surface 2a side) of the housing member 2 made of molded resin in a plate-shaped shape. The second sub passage portion 10B is integrally formed in almost its entirety in a back surface 2b portion (back surface 2b side). In the plate-shaped portion of the housing member 2, there are formed a through portion 2c which passes through from the front to back surface sides, and an opening 2d which communicates with the through portion 2c. In a direction perpendicular to the opening plane of the opening 2d, the third sub passage portion 10C is formed extending across the opposite sides of the opening plane of the opening 2d. The third sub passage portion 10C has a passage portion extending linearly along the front and back surfaces of the plate-shaped portion of the housing member 2 in such a manner to extend across the front and back surface sides thereof. The passage portion is formed along the fluid flow of the main passage 6.

Further details are described. The sub passage 10 includes a first plate-shaped member which is a plate-shaped portion provided at the end side of the housing member 2; a second plate-shaped member which is provided and joined to a front surface 2a side of the first plate-shaped member, and forms the base member 20; and a third plate-shaped member which is provided and joined to a back surface 2b side of the first plate-shaped member, and forms the base member 30. In the first plate-shaped member, there are formed a side wall 10A2 of the first sub passage portion 10A in the front surface 2a; a side wall 10B2 of the second sub passage portion 10B in the back surface 2b; and a side wall 10C2 of the third sub passage portion 10C at a position offset from the back surface 2b in a direction opposite to a direction in which the front surface 2a side faces. In the second plate-shaped member 20, there are formed a side wall 10A20 facing the side wall 10A2 of the first sub passage portion 10A; and a side wall 10C20 of the third sub passage portion 10C facing the side wall 10C2 of the third sub passage portion 10C formed in the first plate-shaped member 2, with the plate-shaped circuit board 7 in between. In the third plate-shaped member 30, there is formed a side wall 10B30 facing the side wall 10B2 of the second sub passage portion 10B.

In the embodiment, a groove portion 2e is formed which is dented from the front surface 2a side to the back surface 2b side of the plate-shaped portion of the housing member 2, and the top surface 10C2 of the third sub passage portion 10C is a bottom surface 2f of the groove portion 2e. However, the bottom surface 2f portion may be formed of the cover member 30 by making the through portion 2c coincide with the opening 2d.

The above-mentioned offset value hof is provided in the direction perpendicular to the front and back surfaces 2a, 2b of the housing 2, and the direction is perpendicular to the direction of the fluid flowing through the first sub passage portion 10A and the second sub passage portion 10B.

In addition, the front surface 2a of the housing 2, where the side wall 10A2 of the first sub passage portion 10A is formed, and the back surface 2b of the housing 2, where the side wall 10B2 of the second sub passage portion 10B is formed, are offset from each other by hof2ab in a direction perpendicular to the surfaces 2a and 2b.

In the first embodiment, the circuit board 7 is disposed in the third sub passage portion 10C so that the opposite surface to the sensor element 8 would be located at a height hc1 from the bottom surface 10C20 of the third sub passage portion 10C, and that the sensor element 8 surface would be located at a height hd1 from the top surface 10C2 of the third sub passage portion 10C.

In addition to the requirement that a passage portion for measurement in which circuit board 7 is disposed should have a height higher than the height 7h of the circuit board 7, it is necessary to take installation tolerances into consideration as well as to a secure sufficient height so as not to disturb the flows of the fluids Fa and Fb. In the configuration of the sub passage 10 as shown in the embodiment, the thickness direction dimension of the thermal type flow measuring device 1 is at least the sum of the height h10A of the first sub passage portion 10A and the height h10B of the second sub passage portion 10B. When the circuit board 7 is disposed in either the first sub passage portion 10A or the second sub passage portion 10B, the first sub passage portion 10A or the second sub passage portion 10B in which to dispose the circuit board 7 needs to individually secure the required height. This causes a problem of making large the thickness direction dimension of the thermal type flow measuring device 1.

In the embodiment, the circuit board 7 is disposed in the third sub passage portion 10C provided between the first sub passage portion 10A and the second sub passage portion 10B. The third sub passage 10C can be formed within a range of the sum of a height h10A of the first sub passage portion 10A and a height h10B of the second sub passage portion 10B in a direction of a height h10C of the third sub passage portion 10C. Even if the height h10C of the third sub passage portion 10C is increased to dispose the circuit board 7 therein, it is still possible for the height h10C to fall within the range of the sum of the height h10A of the first sub passage portion 10A and the height h10B of the second sub passage portion 10B. Consequently, the width (1 h in FIG. 2) of the portion through which the thermal type flow measuring device 1 is inserted in the intake pipe 4 can be made small.

As a result, larger installation tolerances are allowed and the work efficiency can be improved. In addition, since the width (1 h in FIG. 2) of the portion through which the thermal type flow measuring device 1 is inserted in the intake pipe 4 can be made small, miniaturization and weight reduction of the device can be achieved.

Even through the thermal type flow measuring device 1 disposed in the intake pipe 4 has a filter placed at the inlet of the intake pipe 4, water and dust cannot be completely removed from the fluid which flows into the main passage 6 of the intake pipe 4.

Also, most diesel engines have no throttle valve, and thus, after the engine is shut down, oil mist is likely to flow backward to an upstream side inside the intake system by convection of the fluid, and enter the inside of the sub passage. Therefore, the sensor element 8 disposed in the sub passage has a higher possibility to be contaminated by the oil mist.

If water or oil mist adheres to the sensor element 8, there is a possibility that precise flow measurement cannot be made or a failure of the sensor element 8 is caused. There may arise a problem that breakage of the sensor element 8 is caused by a collision of the dust therewith.

Thus, in the first embodiment, a centrifugal separation structure is employed in which the first sub passage portion 10A and the second sub passage portion 10B are curved (or bent) so that water, oil mist, and dust are drawn away and prevented from reaching the sensor element 8.

However, it is difficult to completely remove water, oil mist, and dust. Thus, in the first embodiment, the flow velocity of fluid Fa3 flowing above the sensor element 8 is made greater than that of fluid Fa2 flowing below the sensor element 8, and this velocity difference allows such a separation that water and dust would not be contained in the fluid Fa3 flowing above the sensor element 8.

In order to create a velocity difference between the velocity of the fluid Fa3 flowing above the sensor element 8 and that of the fluid Fa2 flowing below thereof, the cross-sectional area of the fluid Fa3 flowing through its region and that of the Fa2 flowing through its region are made different from each other.

Now, in the first embodiment, in order to have a velocity difference between the fluids separated by the circuit board 7 shown in FIG. 3, i.e., the fluids Fa2 and Fa3 (Fa2>Fa3), the circuit board 7 is disposed so that the opposite surface of the circuit board 7 to the surface thereof where the sensor element 8 is provided would be located at the height hc1 from the bottom surface 10C20 of the third sub passage portion 10C, and the sensor element 8 surface would be located at the height hd1 from the top surface 10C2 of the third sub passage portion 10C, whereby hc1 is greater than hd1.

Figure 4:
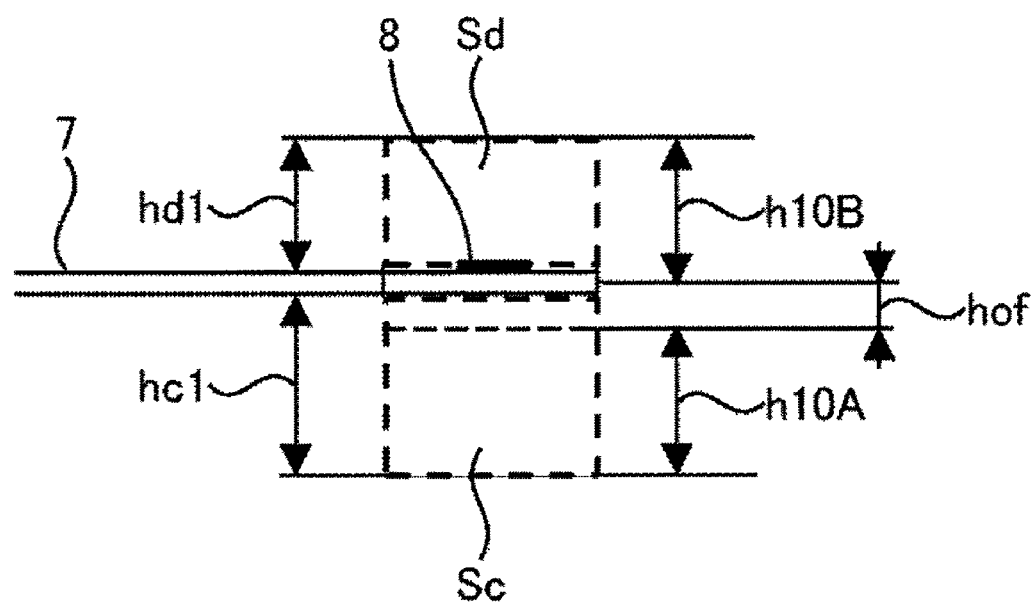
FIG. 4 is a diagram showing cross-sectional areas of a space above a sensor element and a space below a circuit board taken along the line D-D in FIG. 3.

FIG. 4 is a diagram showing a cross-sectional area Sd of a space above the sensor element 8 and a cross-sectional area Sc of a space below the circuit board 7 taken along the line D-D. In a configuration where the first sub passage 10A, the second sub passage 10B, and the third sub passage 10C have the same width W10, the spatial cross-sectional area Sd is smaller than the space cross-sectional area Sc.

With such configuration, the flow velocity of the fluid Fa3 flowing above the sensor element 8 can be made smaller than that of the fluid Fa2 flowing below the circuit board 7, and thus, much of the water and dust contained in the fluid Fa1 of the first sub passage 10A can be included in the fluid Fa2 and caused to pass on the circuit board 7.

Since the water and dust contained in the fluid Fa1 are removed, in the resultant fluid Fa3, possibility of adhesion or collision of the water and dust to or with the sensor element 8 can be reduced. Accordingly, failure of the sensor element 8 due to contamination, or breakage thereof due to collision of dust can be prevented, thereby providing a reliable thermal type flow measuring device 1.

Second Embodiment

Figure 5:
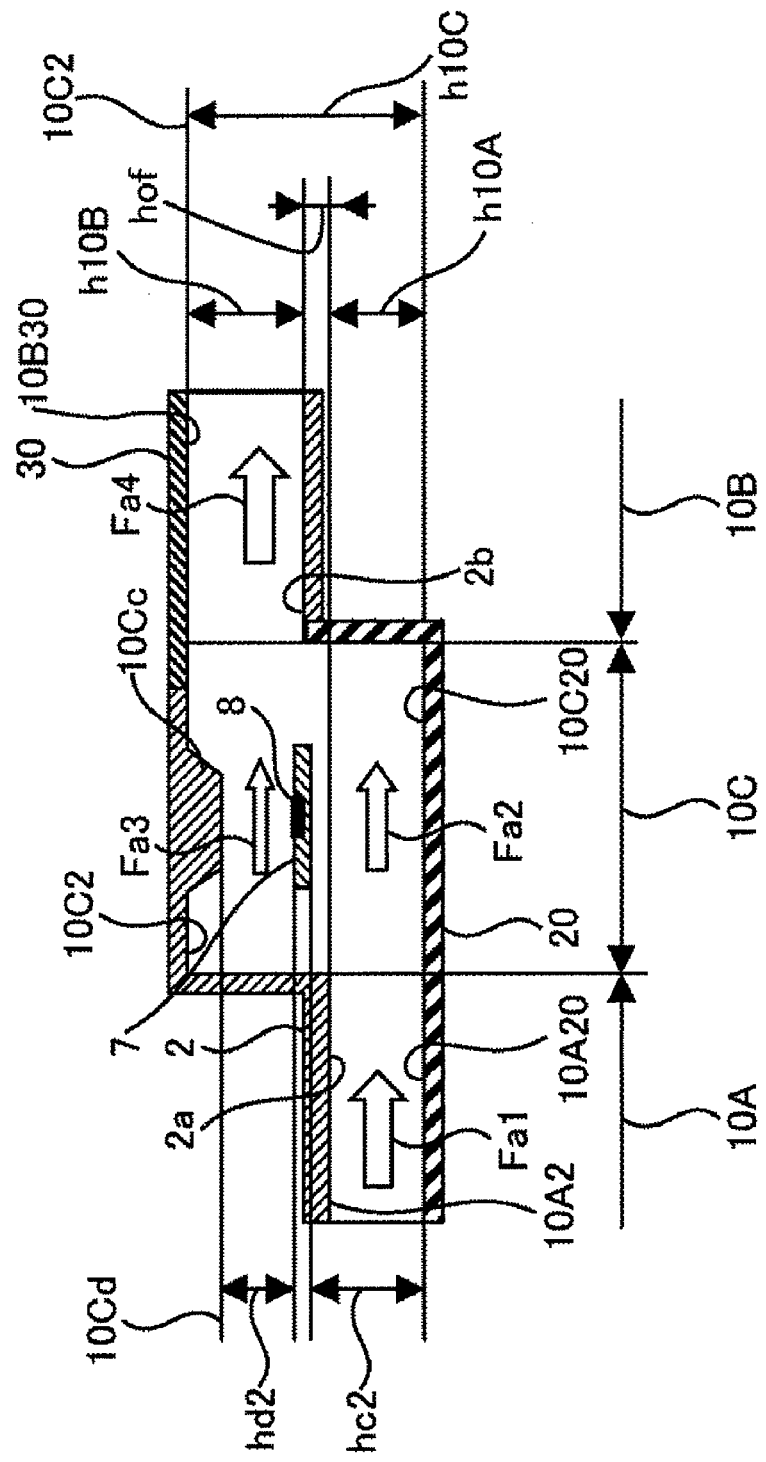
FIG. 5 is a diagram showing an arrangement of a sub passage and a circuit board of another embodiment of the present invention.

FIG. 5 shows a second embodiment of the present invention, and the same reference numerals represent the same components.

In the first embodiment, as a method of increasing the flow velocity of the fluid Fa3 flowing above the sensor element 8, the sensor element 8 is disposed higher than the middle position of the third sub passage portion 10C, but the present invention is not limited to this method.

In FIG. 5, by forming a projecting portion 10Cc on the top surface 10C2, which is faces the sensor element 8, of the third sub passage portion 10C, the space between the sensor element 8 and a bottom surface 10Cd of the projecting portion 10Cc is narrowed.

Accordingly, the cross-sectional area of the space between the sensor element 8 and the projecting-portion bottom surface 10Cd, taken along the line D-D is made smaller than the cross-sectional area below the original top surface 10C2. Thus, the flow velocity of the fluid Fa3 flowing above the sensor element 8 is increased, improving the accuracy of flow measurement.

In FIG. 5, the projecting portion 10Cc is formed in the fluid passage above the sensor element 8, but the present invention is not limited to formation of a projecting portion.

Figure 6:
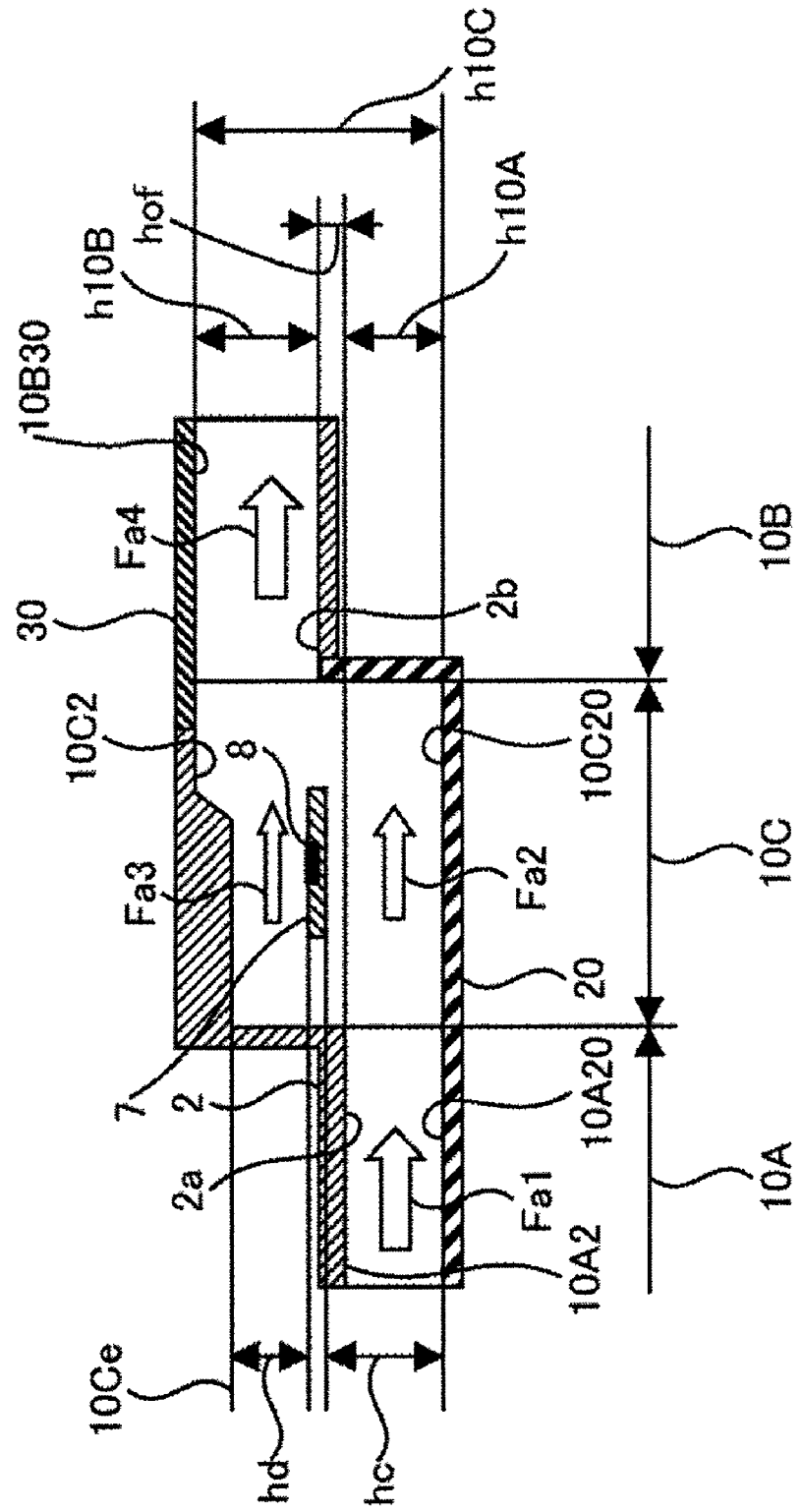
FIG. 6 is a diagram showing an arrangement of a sub passage and a circuit board of another embodiment of the present invention.

FIG. 6 shows a configuration where a top surface 10Ce of the third sub passage portion 10C is formed to narrow the space between the top surface 10Ce and the sensor element 8. This configuration can increase the flow velocity of the fluid Fa3, and thus provide similar effects.

Third Embodiment

In the first and second embodiments, as to the disposition of the circuit board 7, no specific positional relationship between the circuit board 7 and the first sub passage portion 10A is given.

Figure 7:
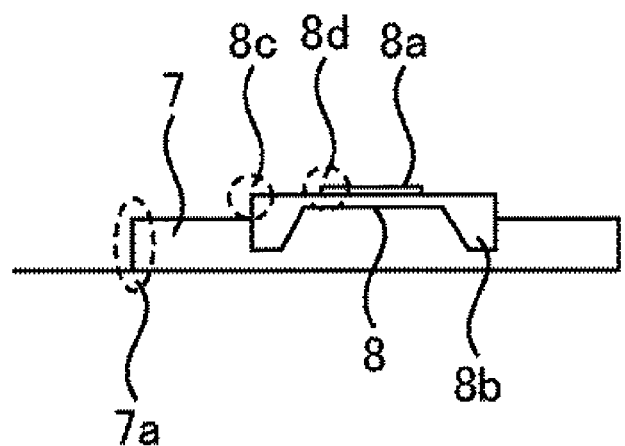
FIG. 7 is a diagram showing a sensor assembly of a circuit board and a sensor element.

The structure of the sensor assembly of the circuit board 7 and the sensor element 8 is shown in FIG. 7.

A diaphragm 8b with a heating resistor 8a formed in a silicon substrate by etching is mounted on a part of the circuit board 7 (ceramic substrate in general), and a drive current is caused to flow so as to keep a constant temperature difference between the heating resistor 8a and the fluid Fa3 flowing above the heating resistor 8a. Then, flow measurement is made by detecting a change in temperature distribution generated by the heating resistor 8a.

Such sensor assembly structure has some problems that when the fluid Fa1 containing water and dust and coming from the first sub passage portion 10A collides with an edge portion 7a of the circuit board 7, an edge portion 8c of the diaphragm, and/or an edge portion 8d of the etched portion, these edge portions may be damaged, whereby errors in flow measurement may be increased, or measurement may become impossible, for example.

Figure 8:
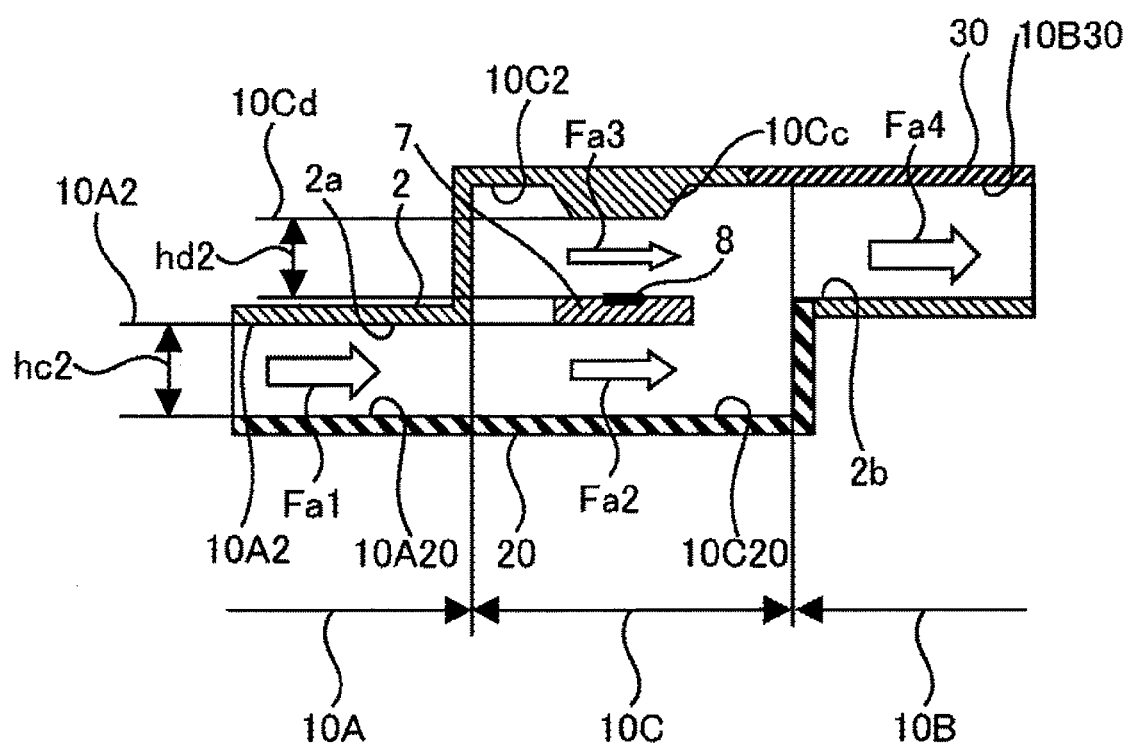
FIG. 8 is a diagram showing an arrangement of a sub passage and a circuit board of another embodiment of the present invention.

FIG. 8 shows an embodiment which solves these problems, and the same reference numerals represent the same components of the second embodiment in FIG. 5.

The circuit board 7 is disposed in such a manner that the bottom surface thereof is on an upper side of the first sub passage portion 10A including an extended line of the top surface 10A2.

That is, the entire circuit board 7 is disposed on the second sub passage portion 10B side so as to hide from the first sub passage portion 10A, the second sub passage portion 10B being offset from the first sub passage portion 10A. In this case, the entire circuit board 7 is preferably disposed at a position offset from the wall surface 10A2 toward the wall surfaces 10C2 and 10B30. Accordingly, the fluid from the first sub passage portion 10A is likely to flow along an opposite surface side of the circuit board 7 from the sensor element 8, and the water and dust carried by the fluid also flow the opposite surface side of the circuit board 7 from the sensor element 8.

Thereby, it is possible to reduce the probability of collision of the water and dust contained in the fluid Fa1 flowing through the first sub passage portion 10A with the edge portion 7a of the circuit board 7.

Figure 9:
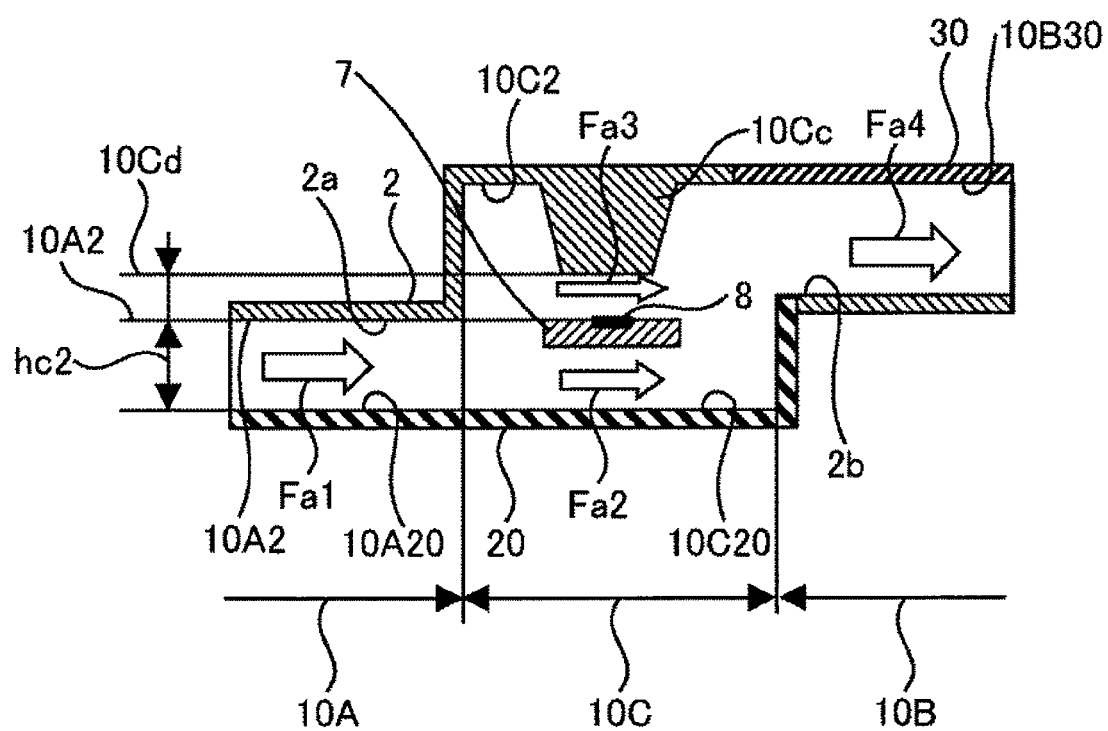
FIG. 9 is a diagram showing an arrangement of a sub passage and a circuit board of another embodiment of the present invention.

Since the mechanical strength of the circuit board 7 is substantially greater than those of the diaphragm and the etched heating resistor 8a, the diaphragm and etched heating resistor 8a may be disposed on the upper side of the first sub passage portion 10A including the extended line of the top surface 10A2, so that the circuit board 7 is disposed on a lower side than the extended line of the top surface 10A2 of the first sub passage portion 10A, as shown in FIG. 9.

In the configuration in FIG. 9, the fluid collides with the edge portion 7a located upstream of the circuit board 7 as described above. In this case, turbulence is generated by the flow which collides with the edge portion 7a, and the water and dust carried by the fluid may flow around to the sensor element 8 side of the circuit board 7. The entire circuit board 7 is preferably disposed at a position offset toward the wall surfaces 10C2, 10B30 from the position of the wall surface 10A2, as shown in FIG. 8 or FIGS. 3, 5, 6.

In the above, the third embodiment is described based on the second embodiment where the projecting portion 10Cc is provided on the third sub passage portion 10C, the embodiments in FIG. 3 and FIG. 6 also provide similar functions and effects.

In each of the first to third embodiments, the third sub passage portion 10C has its left and right walls extending vertically on the first and second sub passage portion sides, respectively, but the walls do not have to extend vertically. Even formed with a certain angle, the walls provide similar functions and effects.

Fourth Embodiment

Figure 10:
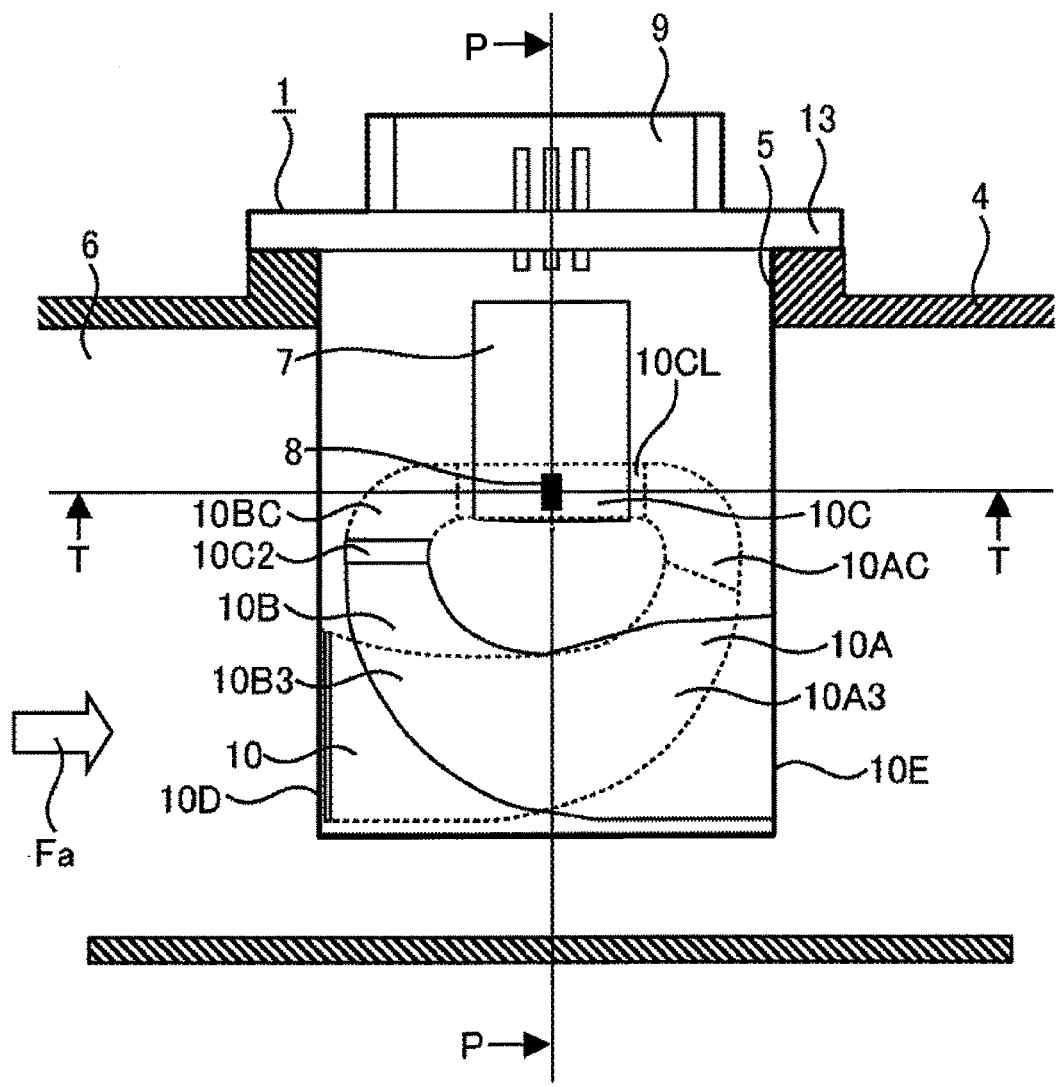
FIG. 10 is a configuration diagram of a thermal type flow measuring device showing one embodiment of the present invention.
Figure 11B:
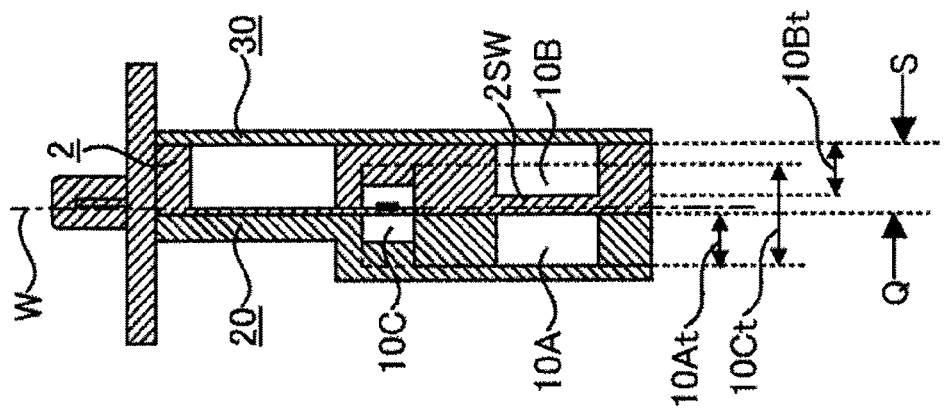
FIGS. 11A and 11B are a cross-sectional view and a cross-sectional exploded view of the thermal type flow measuring device showing the one embodiment of the present invention taken along the line P-P.
Figure 11A:
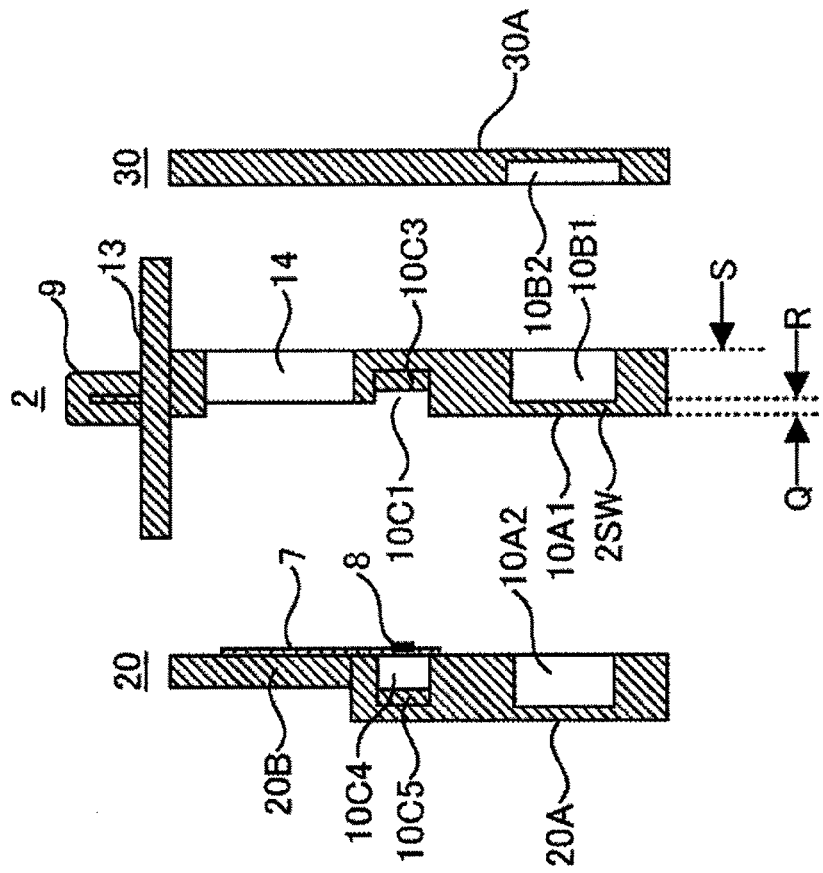
Figure 12:
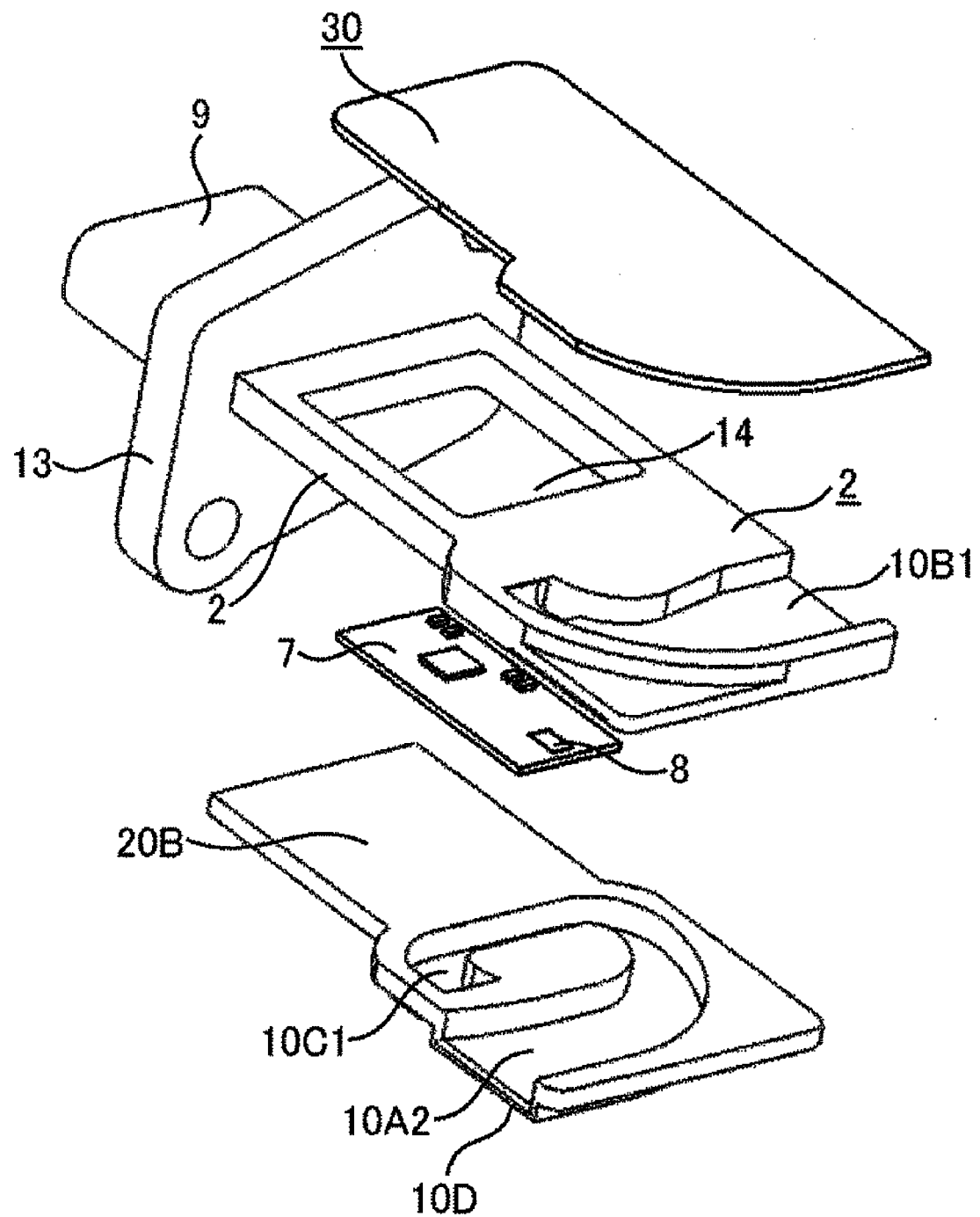
FIG. 12 is an exploded perspective view of the thermal type flow measuring device showing the one embodiment of the present invention.
Figure 13:
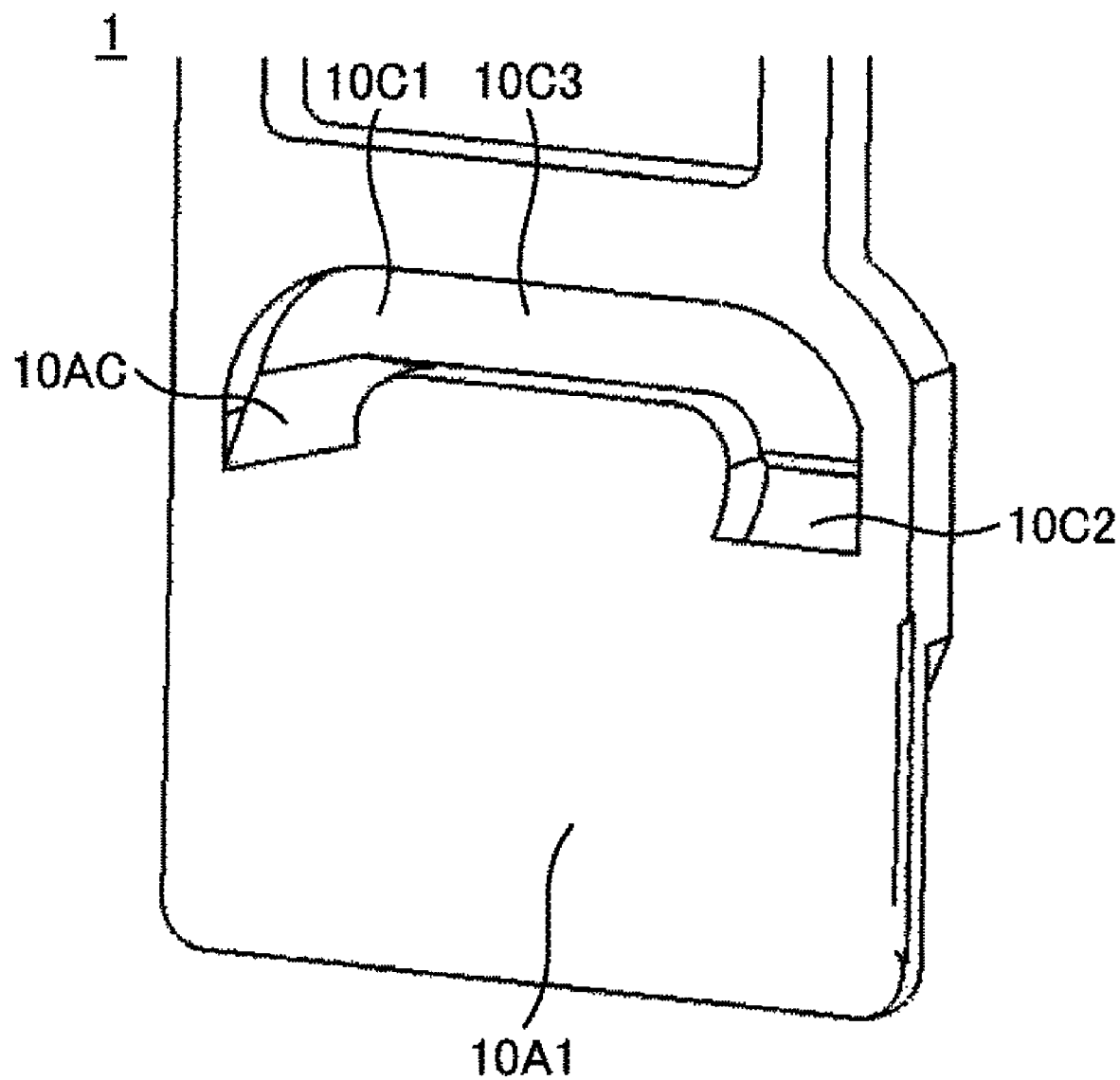
FIG. 13 is a diagram of a housing member of the thermal type flow measuring device showing the one embodiment of the present invention.

FIGS. 10 to 13 each show a configuration of a thermal type flow measuring device according to a fourth embodiment. FIG. 10 is a diagram along the flow direction of fluid in an intake pipe in which the thermal type flow measuring device is disposed. FIGS. 11A and 11B are cross-sectional views taken along the line P-P. FIG. 12 shows a perspective view of the thermal type flow measuring device. FIG. 13 is a perspective view of a lower portion of a housing member. The same reference numerals represent the same components.

The embodiment is described with reference to FIGS. 10 to 13.

A thermal type flow measuring device 1 is an assembly of components shown in FIGS. 11A, 11B and 12, and is inserted through a insertion hole 5 formed in an intake pipe 4 shown in FIG. 10. The thermal type flow measuring device 1 is attached to the intake pipe 4 with its lower portion located inside a main passage 6. The thermal type flow measuring device 1 takes fluid Fa flowing through the main passage 6 into a sub passage 5, measures a flow rate by a sensor element 8 disposed on a circuit board 7, and outputs the measured flow rate to a connector 9 having terminals for power supply and signal output.

The sensor element 8 is a plate-shaped element having a silicon diaphragm with a resistor formed thereon by etching, and acts as a heating resistor when energized.

As shown in FIGS. 11 and 12, the thermal type flow measuring device 1 is formed of an assembly of a housing member 2 made of molded resin, and a base member 20 and a cover member 30 which are made of molded resin and cover the housing member 2.

FIG. 11A shows a cross-sectional view of each of the housing member 2, the base member 20, and the cover member 30 taken along the line P-P in FIG. 10 before they are assembled, and FIG. 11B shows the cross-sectional view after they are assembled. FIG. 12 shows a perspective view of the members before they are assembled. The same reference numerals represent the same components.

The resin molded housing member 2 includes: the connector 9; a flange 13 for mounting to the intake pipe 4; a through portion 14 in which the circuit board 7 is disposed; a portion 10A1 of a first sub passage portion 10A formed on a Q plane side; a portion 10B1 of a second sub passage portion 10B on an R plane side; a portion 10C1 of a third sub passage portion 10C passing through the Q and R plane sides; a through portion 10C2 passing through from the Q plane side to the R plane side and allowing the portion 10C1 of the third sub passage portion 10C to communicate with the second sub passage portion 10B1 formed on the R plane side; and a projecting portion 10C3 facing the sensor element 8 disposed on the circuit board 7, in the portion 10C1 of the third sub passage portion 10C.

The resin molded base member 20 includes: an outer wall surface 20A; a portion 10A2 of the first sub passage portion 10A; a portion 10C4 of the third sub passage portion 10C; and a projecting portion 1005 facing the opposite side of the circuit board 7 to the side thereof where the sensor element 8 is mounted, in the portion 10C4 of the third sub passage portion 10C.

In the resin molded cover member 30, there are formed an outer wall surface 30A and a portion 10B2 of the second sub passage portion 10B.

The first sub passage portion 10A is formed of the portions 10A1 and 10A2 by joining the housing member 2 and the base member 20. The second sub passage portion 10B is formed of the portions 10B1 and 10B2 by joining the housing member 2 and the cover member 30. The third sub passage portion 10C is formed of the portions 10C1 and 10C4 by joining the housing member 2 and the base member 20.

In a sub passage 10 according to the above-mentioned configuration, as shown in FIGS. 10 and 11, the first sub passage portion 10A curving to make a directional change and the second sub passage portion 10B curving to make a directional change are disposed in such a manner as to have no intersection and to form layers respectively on two sides in a direction perpendicular to a separation plane W with the separation plane W in between, and the first and second sub passage portions 10A and 10B, which form the layered structure, communicate with each other by the third sub passage portion 10C. The third sub passage portion 10C is formed so that the cross section thereof, taken along a direction perpendicular to the flow direction of the fluid flowing through the third sub passage portion 10C, would extend across both sides of the separation plane W in the direction perpendicular to the separation plane W.

In FIGS. 11A and 11B, the housing member 2 is provided with a separation wall 2SW which separates the first sub passage portion 10A and the second sub passage portion 10B from each other. A linear passage portion 10CL of the third sub passage portion 10C is formed in such a manner that the cross sectional of the linear passage portion 10CL, taken along a direction perpendicular to the flow direction of the fluid flowing through the linear passage portion 10CL, extends across both sides of the separation wall 2SW in a direction perpendicular to the separation wall 2SW. The separation wall 2SW separates the layer of the first sub passage portion 10A and the layer of the second sub passage portion 10B. A first communication passage portion 10AC, which allows the first sub passage portion 10A to communicate with the third sub passage portion 10C, curves to make a directional change and also connects the passage wall surface 10A1, which is defined by the separation wall 2SW, of the first sub passage portion 10A to the side wall of the third sub passage portion 10C by using an inclined surface, the side wall being located on the second sub passage portion 10B side with respect to separation wall 2SW. A through passage 10C2 which passes through the separation wall 2SW is provided in a second communication passage portion 10BC, which allows the second sub passage portion 10B to communicate with the third sub passage portion 10C, and the sensor element 8 is disposed in the third sub passage portion 10C.

The layered structure of the fourth embodiment is basically similar to the ones of the first, second, and third embodiments. In the fourth embodiment, the sub passage 10 is further divided into smaller components. The details are described below.

One end (outer end) of the first sub passage portion 10A forms an inlet opening plane 10D of the fluid flow, and the other end (inner end) of the first sub passage portion 10A is connected to the communication passage portion 10AC. Thus, the first sub passage portion 10A is communicatively connected to one end of the third sub passage portion 10C via the communication passage portion 10AC. One end (outer end) of the second sub passage portion 10B forms an outlet opening plane 10E of the fluid flow, and the other end (inner end) of the second sub passage portion 10B is connected to the communication passage portion 10BC. Thus, via the communication passage portion 10BC, the second sub passage portion 10B is communicatively connected to the opposite end of the third sub passage portion 10C to the end to which the communication passage portion 10AC is connected. The inlet opening plane 10D and the outlet opening plane 10E each open on a perpendicular plane to the fluid flow of the main passage 6.

As described below, the communication passage portion 10AC is inclined with respect to the plane (Q plane) on which the portion 10A1 of the first sub passage portion 10A is formed. The above-mentioned through portion 10C2 is open the communication passage portion 10BC. The through portion 10C2 has an opening plane inclined with respect to the Q and R planes.

Initially, the fluid to be measured flows into the first sub passage portion 10A in the same direction as the fluid flowing through the main passage 6. The fluid to be measured changes the flow direction thereof through a curved portion (bent portion) 10A3 of the first sub passage portion 10A that curves to make a directional change, and in the third sub passage portion 10C, the fluid to be measured flows in the opposite direction to the fluid flowing through the main passage 6. After flowing into the second sub passage portion 10B from the third sub passage portion 10C, the fluid to be measured changes its flow direction through a curved portion (bent portion) 10B3 of the second sub passage portion 10B that curves to make a directional change. In proximity to the outlet opening portion 10E of the second sub passage portion 10B, the fluid flows in the same direction as the fluid flowing through the main passage 6.

The configurations of the communication passage portion 10AC and the inclined surface in the communication passage portion 10AC as well as of the communication passage portion 10BC and the inclined surface in the communication passage portion 10BC can also be used in the first, second, and third embodiments.

The thermal type flow measuring device formed of the housing member 2, the base member 20, and the cover member 30 is assembled as follows.

First, the surface of the circuit board 7 on which no component is mounted is bonded and fixed to the base member 20. Next, the base member 20 is bonded and fixed to the housing member 2. Thus, the first sub passage portion 10A and the third sub passage portion 10C are formed with all sides enclosed.

Next, terminals of the circuit board 7 fixed to the base member 20 exposed to the through portion 14 (cavity) of the housing member 2 are connected to the terminals of the connector 9 by wire bonding. Then, sealing gel is injected into the through portion 14 to prevent contact with the air.

Next, the cover member 30 is aligned with the housing member 2 and bonded and fixed together with resin adhesive. Thus, the second sub passage portion 10B is formed with all sides enclosed.

In FIGS. 10 to 13, the communication passage portion 10AC is formed as an inclined surface becoming lower from the surface of the passage portion 10A1 toward the downstream side (see FIGS. 10 and 13) so that a height (thickness direction dimension) 10Ct of the third sub passage portion 10C perpendicular to the fluid flow direction would be extend to the second sub passage portion 10B side and thus be greater than a height 10At of the first sub passage portion 10A.

Accordingly, in the third sub passage portion 10C, the circuit board 7 with the sensor element 8 mounted thereon can be disposed in such a manner that the fluid flows along the front surface of the circuit board 7 where the sensor element 8 is mounted, as well as along the opposite surface (back surface) thereof to the front surface thereof where the sensor element 8 is mounted. In addition, the flow velocities of the fluids flowing along a passage 10CU on the front surface side of the circuit board 7 and along a passage 10CD on the back surface side of the circuit board 7 can be adjusted by the projecting portion 10C3 of the housing member 2 and the projecting portion 10C5 of the base member 20 which are formed in the third sub passage portion 10C.

An air filter is disposed upstream of the intake pipe 4 to remove foreign matters such as dust in the fluid Fa flowing through the main passage 6; however, if unfiltered dust enters the first sub passage portion 10A from the inlet opening plane 10D and reaches the third sub passage portion 10C, the sensor element 8 may be damaged or the accuracy of the flow measurement may be reduced due to the collision of the dust with the sensor element 8.

The kinetic energy of the dust entering the third sub passage portion 10C is reduced by causing the dust entering the first sub passage portion 10A to collide with the peripheral inner wall surface of the curved portion 10A3 by centrifugal separation action. With this mechanism, damage to the sensor element 8 due to the collision of the dust reaching the third sub passage portion 10C is prevented. In the embodiment, protection performance for the sensor element 8 from the dust can be further improved by the projecting portions 10C3 and 10C5 of the third sub passage portion 10C.

Figure 14:
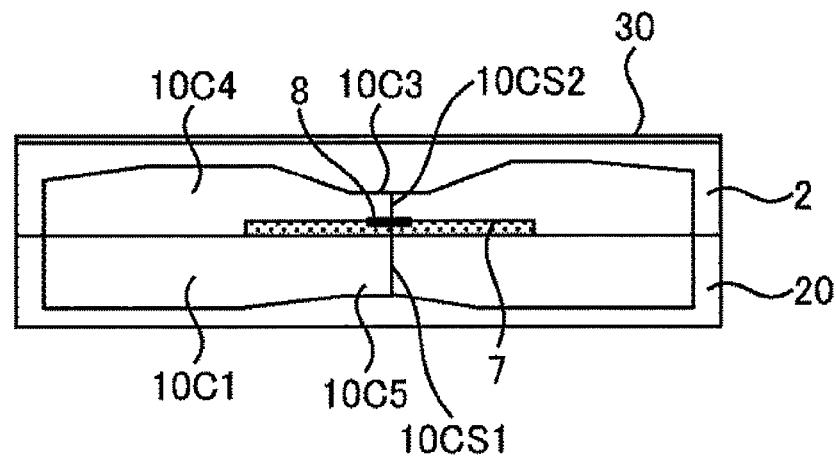
FIG. 14 is a cross-sectional view of the thermal type flow measuring device showing one embodiment of the present invention taken along the line T-T.

FIG. 14 shows a cross-sectional view taken along the line T-T in FIG. 10. In the third sub passage portion 10C in which the sensor element 8 is disposed, the projecting portion 10C3 of the housing member 2 is formed above the sensor element 8, and the projecting portion 10C5 of the base member 20 is formed below the sensor element 8. The flow velocity of the fluid flowing above the sensor element 8 (passage 10CU) is reduced by making a upper passage sectional-area 10CS2 smaller than a lower passage sectional-area 10CS1 where the cross section is taken along the center line of the sensor element 8.

Accordingly, much of the dust is carried by the fluid which flows below the sensor element 8 at a higher flow velocity, and thus the amount of dust contained in the fluid which flows above the sensor element 8 can be reduced.

According to the embodiment, the dimension of the third sub passage portion 10C in the width direction of the device can be made greater than those of the first sub passage portion 10A and the second sub passage portion 10B, and thus flexibility of the disposition of the circuit board 7 with the sensor element 8 mounted thereon is improved. In addition, since the dust contained in the fluid above the sensor element 8 can be reduced, this is effective in reducing the damage to the sensor element 8.

The projecting portion 10C3 of the housing member 2 and the projecting portion 10C5 of the base member 20 in the third sub passage portion 10C shown in FIG. 14 may be changed according to given specification of the thermal type flow measuring device 1, and the projecting portions may not necessarily be formed. The passage sectional-areas 5CS1 and 5CS2 of the passage may be adjusted depending on the arrangement of the circuit board 7.

Meanwhile, in the fluid Fa which flows through the main passage 6, a drift flow may be generated due to the shape of the intake pipe 4 and/or the air filter located on the upstream side. Taking in fluids with different flow velocity distributions may cause an error in the flow measurement.

In the fourth embodiment, the passage portion from the first sub passage 10A to the passage 10CU on the front surface side of the circuit board 7, first has an area where the curved portion (bent portion) 10A3 of the first sub passage 10A is formed. Then, on a downstream side of the area, a passage portion which changes its passage direction to a direction perpendicular to the curved surface of the curved portion (bent portion) 10A3 is formed by the communication passage portion 10AC as an inclined surface. Since such curved passage structure has an effect to make uniform the flow velocity distribution in the third sub passage portion 10C, errors in the flow measurement by the sensor element 8 can be reduced.

Furthermore, since the first sub passage portion 10A has a contracted flow structure in which the first sub passage 10 A becomes narrower from the inlet opening plane 10D, the flow velocity distribution of the fluid taken in is made uniform, whereby flow measurement with less error can be performed.

Similarly to the inflow opening plane (inlet) 10D, the outlet opening plane 10E opens on a perpendicular plane to the flow direction of the fluid (back flow in the opposite direction to the direction of Fa) flowing through the main passage 6.

However, particularly in a system without a throttle valve such as a diesel engine, if the outflow opening plane (outlet) 10E opens on the perpendicular plane to the direction of the back flow, oil mist flows backward to an upstream side inside the intake system by convection of the fluid after the engine is shut down. Thus, the oil mist tends to enter the second sub passage 10B easily, and cause contamination of the sensor element 8 upon reaching the sensor element 8.

To solve this, in the embodiment, similarly to the first sub passage portion 10A, the curved portion (bent portion) 10B3 is formed in the second sub passage portion 10B as well so that the oil mist adheres to the peripheral inner wall surface of the curved portion (bent portion) 10B3 by centrifugal separation action, thereby preventing the sensor element 8 from contamination.

Also, in the embodiment, the three members of the housing member 2, the base member 20, and the cover member 30 can be injection molded with simple molds. With three resin molded components so injection molded with such simple molds, the loop sub passage 10 in a layered structure can be achieved.

Also, since bonding of the three members takes place between molded resin articles, improved reliability of the bonded portions can be achieved.

Since the weight of the sub passage 10 is lighter with the molded resin articles compared with the case that metal molded articles are used for all or a part of the three members, stress on the mounting flange 13 due to vibration is reduced, whereby a highly reliable thermal type flow measuring device 1 can be achieved.

In the embodiment, the housing member 2, the base member 20, and the cover member 30 made of molded resin have been described. However, even if using a metal member for all or a part of the three members, such embodiment does not depart from the spirit of the present invention as long as the first sub passage portion 10A, the second sub passage portion 10B, the third sub passage portion 10C, and the communication passage portions 10AC and 10BC are formed in the three members as described above.

With a configuration in which the circuit board 7 is disposed on a base member 20 made of a metal material, heat generated by the circuit board 7 can be effectively radiated.

In the embodiment, the three members of the housing member 2, the base member 20, and the cover member 30 are assembled together. However, even if using an assembly of three or more members, such embodiment does not depart from the spirit of the present invention as long as the first sub passage portion 10A, the second sub passage portion 10B, the third sub passage portion 10C, and the communication passage portions 10AC and 10BC are formed. For example, in FIG. 11A and 11B, a board holding portion 20B of the base member 20 may be formed of a metal member separately, and the circuit board 7 may be disposed on the metal member. In this case, the thermal type flow measuring device 1 is formed of four members of the housing member 2, the base member 20, the cover member 30, and the board holding portion 20B. By using a metal material for the board holding portion 20B, the heat radiation effect can be vigorously used for the circuit board 7.

Fifth Embodiment

In the fourth embodiment, various measures are taken against the dust which enters from the inlet opening plane 10D. On the other hand, in a fifth embodiment, another measure to prevent damage to the sensor element 8 is further taken.

In the fourth embodiment, when dust is contained in the fluid following through the first sub passage portion 10A, the kinetic energy of the dust is reduced by the collision thereof due to centrifugal separation action from the curved portion (bent portion) 10A3 shown in FIG. 1, whereby the sensor element 8 is protected from being damaged. Nonetheless, the centrifugal separation effect due to the curved portion (bent portion) 10A3 alone cannot eliminate the possibility of the damage from the collision of the dust with the sensor element 8.

Figure 15:
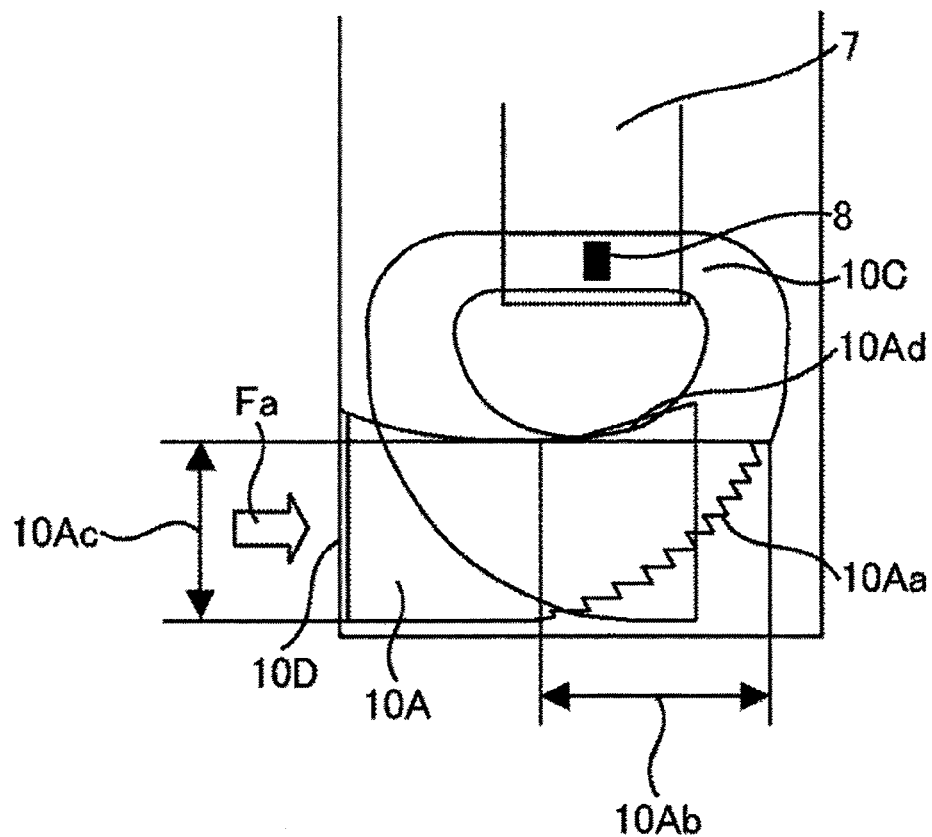
FIG. 15 is a diagram of a sub passage of a thermal type flow measuring device showing another embodiment of the present invention.

Thus, in the embodiment, as shown in FIG. 15, a peripheral inner wall surface 10A*a* of the first sub passage portion 10A is formed in such a jagged shape that the kinetic energy of the dust is reduced after it collides with the peripheral inner wall surface 10A*a*.

Figure 16:
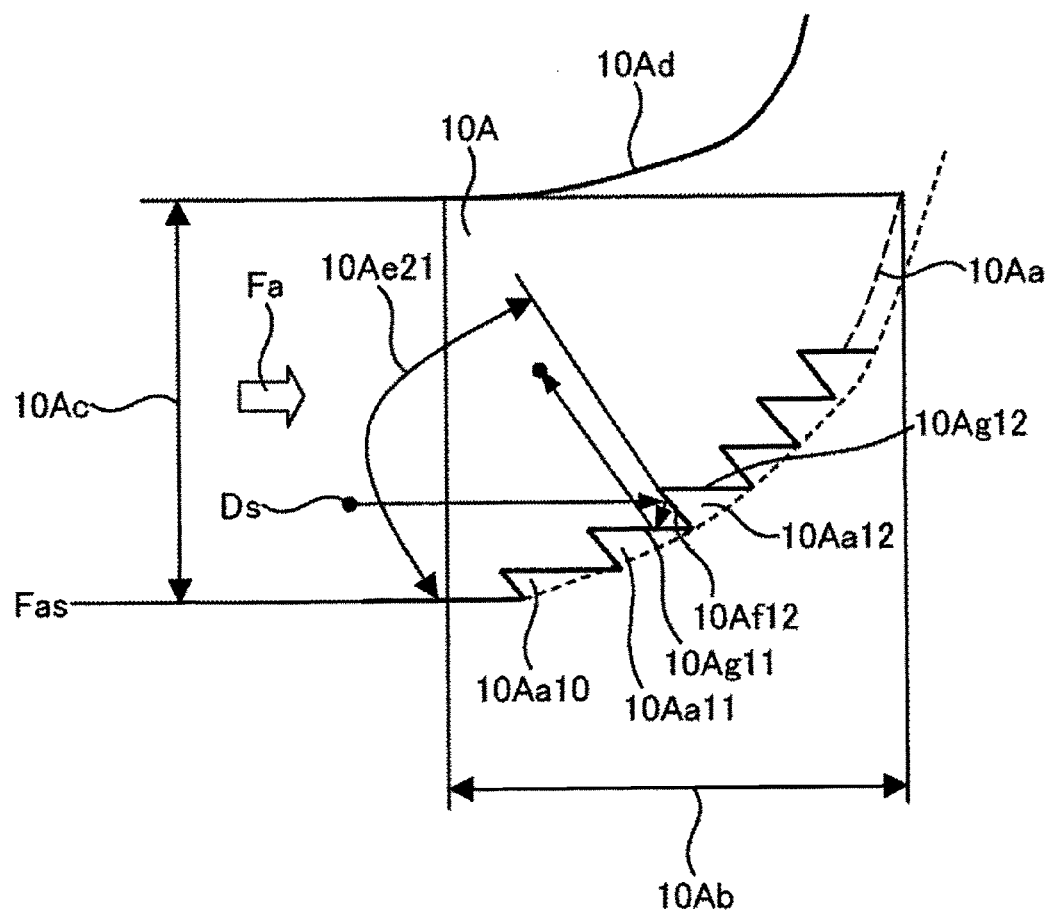
FIG. 16 is a diagram of another sub passage of the thermal type flow measuring device of the other embodiment of the present invention.

FIG. 16 shows the detail of the jagged shape of the inner surface 10A*a*, and a trajectory of dust when it collides with the jagged portions.

A jagged shape 10A*a*12 is formed of surfaces 10A*f*12 and 10A*g*12 where the surface 10A*f*12 makes an angle 10A*e*21 with a surface Fas, and the surface 10A*g*12 is parallel to the surface Fas. Other jagged shapes 10A*a*10 and 10A*a*11 are formed in a similar manner to the jagged shape 10A*a*12, and the angles of the jagged shapes 10A*a*10 and 10A*a*11 corresponding to the angle 10A*e*21 all have values smaller than 90 degrees.

That is, saw-toothed jagged shapes are continuously formed entirely across a peripheral wall surface 10A*b* of the first sub passage portion 10A, the peripheral wall surface 10A*b* curving to make a directional change.

When entering the first sub passage portion 10A along with the fluid Fa, dust contained in the fluid collides with the surface 10A*f*12 in the jagged shape 10A*a*12.

The dust which has collided with the surface 10A*f*12 bounces off at the same angle as the collision incidence angle on the surface 10A*f*12, collides with a surface 10A*g*11 of the jagged shape 10A*a*11, and bounces off again to the first sub passage portion 10A at the same angle as the collision incidence angle on the surface 10A*g*11.

The kinetic energy of the dust is reduced for each collision. Since the distance of the first sub passage portion 10A is short, the dust reaches the sensor element 8 without gaining a sufficient flow velocity.

Before reaching sensor element 8, some of the dust collides with the wall surface due to the centrifugal separation effect, and the kinetic energy of the dust is further reduced.

By reducing the kinetic energy of the dust in this manner, collision of the dust with the sensor element 8 does not cause damage to the sensor element 8.

The jagged shapes 10A*a* are formed in a region 10A*c* which is defined through projection from the inlet opening plane 10D of the first sub passage portion 10A. Larger dust contained in the fluid Fa has more inertia and thus moves more linearly. Such dust has more chances to collide with the jagged shape 10A*a*, and the kinetic energy thereof when reaching the sensor element 8 is more reduced.

According to the embodiment, even if dust contained in the fluid Fa enters the first sub passage portion 10A, the dust collides with the jagged shapes 10A*a* so that the kinetic energy of the dust can be reduced, and damage can be prevented even if the dust reaches the sensor element 8. Thus, a highly reliable thermal type flow measuring device can be achieved.

Figure 17:
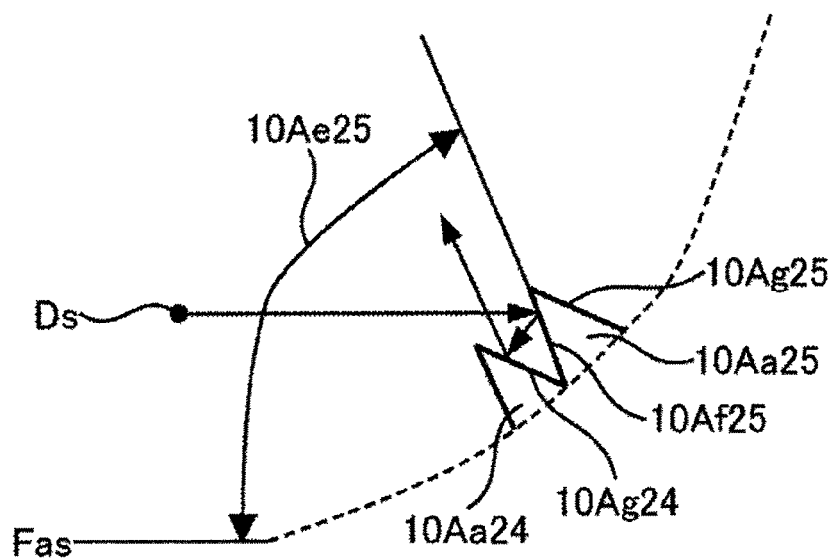
FIG. 17 is a diagram of another sub passage of the thermal type flow measuring device of the other embodiment of the present invention.

FIG. 17 shows another example of the jagged shapes.

A jagged shape 10A*a*25 is formed of a surface 10A*f*25 and a surface 10A*g*25 where the surface 10A*f*25 makes an angle 10A*e*25 with a surface Fas parallel to the fluid Fa, and the surface 10A*g*25 is not parallel to the surface Fas, which is parallel to the fluid Fa. Another jagged shape 10A*a*24 is also formed in a similar manner. The angle 10A*e*25 has a value smaller than 90 degrees.

A dust Ds which has collided with the surface 10A*f*25 collides again with the surface 10A*g*24 of the jagged shape 10A*a*24 and bounces back to the first sub passage portion 10A. Thus, the same effect as that shown in FIG. 16 is achieved.

Figure 18:
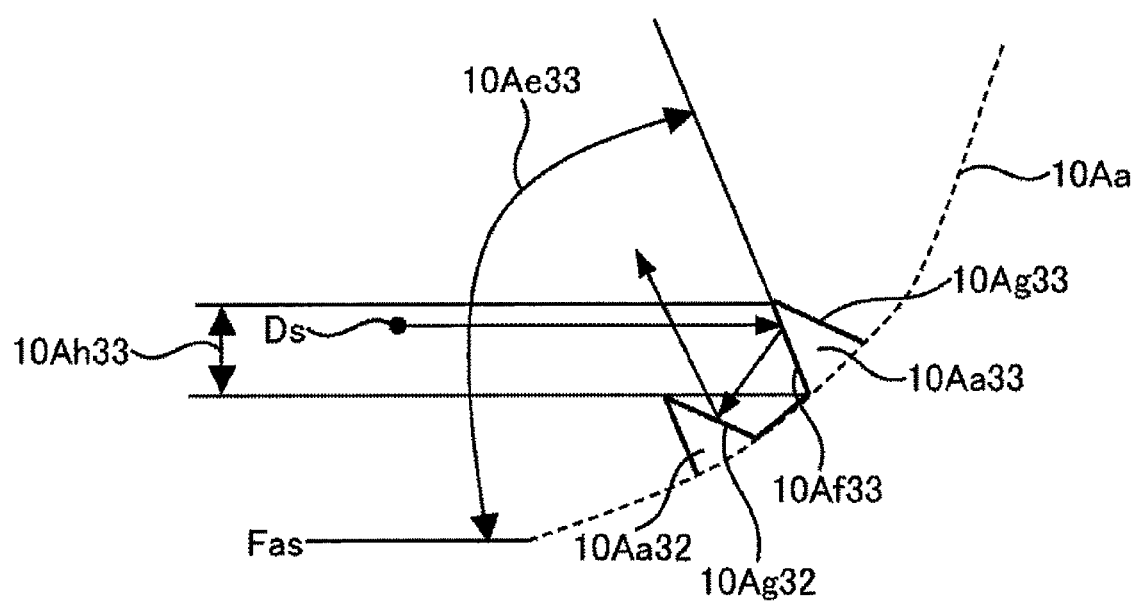
FIG. 18 is a diagram of another sub passage of the thermal type flow measuring device of the other embodiment of the present invention.

FIG. 18 shows still another example. In the drawing, on a surface 10A*a* on which to form jagged shapes, jagged shapes are formed intermittently.

A jagged shape 10A*a*33 is formed so that the vertex of an adjacent jagged shape 10A*a*32 is located on a surface Fas33 being parallel to the fluid Fa and including the intersection between a surface 10A*f*33 of the jagged shape 10A*a*33 and the surface 10A*a*.

Accordingly, when in a range 10A*h*33 between the vertexes of the jagged shapes 10A*a*33 and 10A*a*32, the dust Ds inevitably collides with the surface 10A*f*33 of the jagged shape 10A*a*33. By making an angle 10A*e*33 smaller than 90 degrees, the same effect as that shown in FIG. 16 or 17 can be achieved.

Furthermore, in FIG. 18, the number of jagged shapes on the surface 10A*a* can be reduced, and thus this is effective in further reducing the man-hour for metal mold processing.

Figure 19:
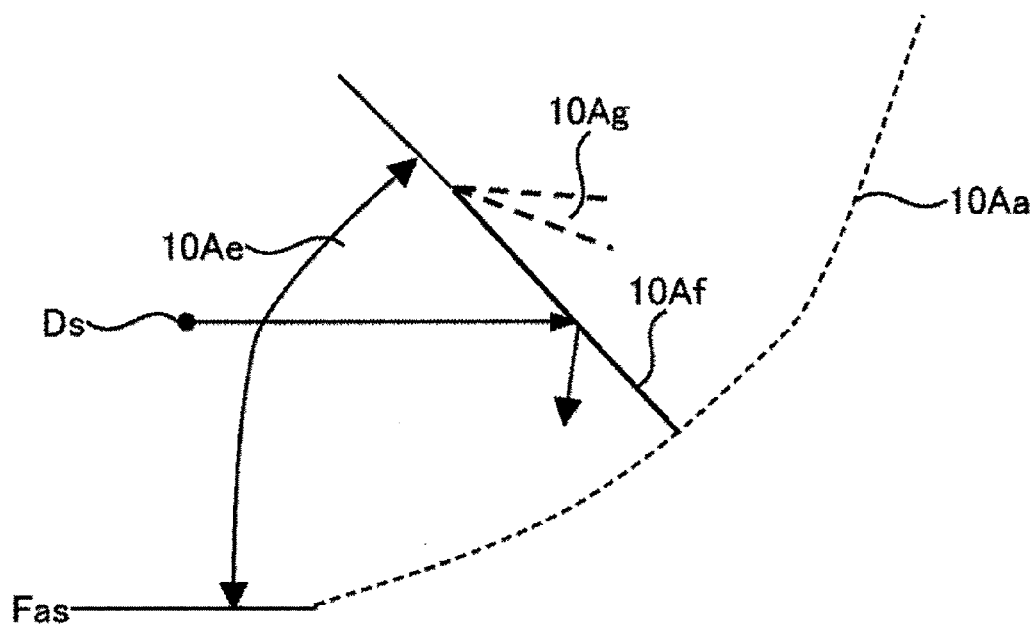
FIG. 19 is a diagram of another sub passage of the thermal type flow measuring device of the other embodiment of the present invention.

FIG. 19 shows a jagged shape's collision surface 10A*f* with which dust Ds collides. If an angle 10A*e* formed by the surface Fas parallel to the fluid Fa and a collision surface 10A*f* is not more than 90 degrees, the dust Ds inevitably collides with the adjacent upstream jagged shape. This shows that it is not necessary to specify the shape of the surface 10A*g*.

FIGS. 16 to 19 show the cases where jagged shapes are formed by defining the angle 10A*e* formed by the surface Fas parallel to the fluid Fa and the collision surface 10A*f*. Although an effective result can be obtained without being influenced by the size of the dust, the jagged shapes may be formed in the following way if dust which reaches the sensor element 8 has a relatively small size (100 μm or less).

Specifically, satin-like micro jagged shapes are formed irregularly on the surface so that the jagged shapes are with an order of 100 μm or less. The satin-like jagged shapes can be formed by applying satin-like finish on the portion 10A*a* of the first sub passage portion 10A in a metallic mold for the base member 20. The satin-like finish is effective in reducing the cost for forming the jagged shapes shown in FIGS. 16 to 19, and also in suppressing increase in weight thereof.

In the embodiment, as shown in FIG. 15, the outlet opening plane 10E is located closer to the inlet opening plane 10D than a downstream end surface 2ES of the housing member 2 is. Similarly to the fifth embodiment, in each of the first to fourth embodiments, the outlet opening plane 10E may be located closer to the inlet opening plane 10D than from a downstream end surface of the housing member 2.

An internal combustion engine with an electronic fuel injection system, which incorporates the thermal type flow measuring device 1 of any one of the first to fifth embodiments as an intake air flow sensor, is described.

Figure 20:
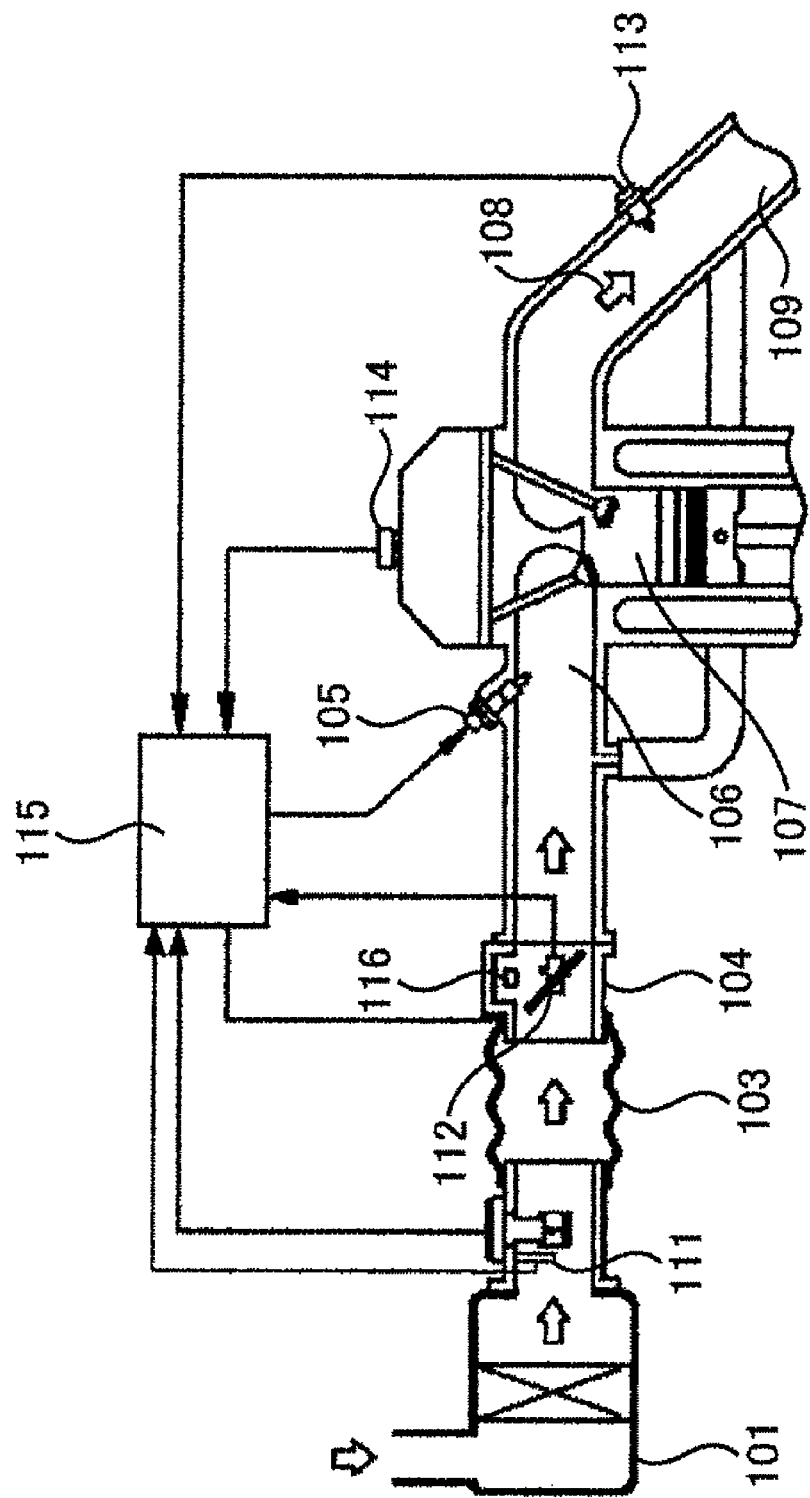
FIG. 20 is a configuration diagram of an internal combustion engine with a thermal type flow measuring device of the present invention.

FIG. 20 is a block diagram of the internal combustion engine with an electronic fuel injection system.

Intake air sucked by an air cleaner 101 is passed through a suction duct 103, a throttle body 104, an intake manifold 106 provided with an injector 105 for supplying fuel, and is sucked by an engine cylinder 107. Meanwhile, used combustion gas generated in the engine cylinder is exhausted through an exhaust manifold 109.

The thermal type flow measuring device 1 is located between the air cleaner 101 and the throttle body 104. A control unit 115 receives an air flow rate signal outputted from the thermal type flow measuring device 1, an intake air temperature signal from an intake air temperature sensor 111, a throttle valve angle signal outputted from a throttle angle sensor 112, an oxygen concentration signal outputted from an oxygen analyzer 113 provided to the exhaust manifold 109, an engine speed signal outputted from an engine speed meter 114, and the like.

The control unit 115 performs sequential operations using these signals to thereby determine the optimal fuel injection amount and idle air control valve opening, and controls the injector 105 and an idle control valve 116 using the optimal amount and opening.

REFERENCE SIGNS LIST 1 thermal type flow measuring device
2 housing member
3 electric chamber
4 intake pipe
5 insertion hole
6 main passage
7 circuit board
8 sensor element
9 connector
10 sub passage
10A first sub passage portion
10B second sub passage portion
10C third sub passage portion
10D inlet opening plane
10E outlet opening plane
10AC communication passage (height direction bypass portion)
10A3 surface direction bypass portion
10C3 projection of third sub passage on sensor element side
10C5 projection of third sub passage on opposite side to sensor element side
13 mounting flange
14 opening of housing member

The invention claimed is:

1. A thermal type flow measuring device comprising:
a sub passage which takes in a portion of a fluid flowing through a main passage; and
a sensor element disposed in the sub passage to thereby detect a flow rate of the portion of the fluid, wherein
the sub passage has
a first sub passage portion formed in a front surface side of a plate-shaped member and curving with no intersection,
a second sub passage portion formed on a back surface side of the plate-shaped member and curving with no intersection, and
a third sub passage portion formed as an opening which passes through from the front surface side to the back surface side of the plate-shaped member,
the first sub passage portion is communicatively connected to one end of the third sub passage portion in a direction along a plate surface of the plate-shaped member,
the second sub passage portion is communicatively connected to the other end of the third sub passage portion in the direction along the plate surface of the plate-shaped member, and
the sensor element is disposed in the third sub passage portion.

2. The thermal type flow measuring device according to claim 1, wherein
the sensor element is mounted on a front surface side of a plate-shaped circuit board,
the plate-shaped circuit board is disposed on a portion, located on the back surface side of the plate-shaped member, in the third sub passage portion, and is attached in such a manner that a back surface of the plate-shaped circuit board faces a side of a portion, located on the front surface side of the plate-shaped member, in the third sub passage portion.

3. The thermal type flow measuring device according to claim 1, wherein a sectional area of a passage formed on a side of one passage wall surface of the third sub passage portion is smaller than a sectional area of a passage formed on a side of a different passage wall surface of the third sub passage portion, the one passage wall surface facing an element surface of the sensor element, the different passage wall surface facing the back surface of the plate-shaped circuit board.

4. The thermal type flow measuring device according to claim 1, wherein a passage gap formed between one passage wall surface of the third sub passage portion and an element surface of the sensor element is smaller than a passage gap formed between a different passage wall surface of the third sub passage portion and the back surface of the plate-shaped circuit board, the one passage wall surface facing the element surface, the different passage wall surface facing the back surface.

5. The thermal type flow measuring device according to claim 1, wherein
the third sub passage portion has a passage portion extending across the front surface side and the back surface side of the plate-shaped member and also extending linearly along a front surface and a back surface of the plate-shaped member, and
the sensor element is disposed in the passage portion extending linearly.

6. The thermal type flow measuring device according to claim 1, wherein
the sub passage is formed by a first plate-shaped member being the plate-shaped member, a second plate-shaped member provided on the front surface side of the first plate-shaped member, and a third plate-shaped member provided on the back surface side of the first plate-shaped member,
in the first plate-shaped member, there are formed
a side wall of the first sub passage portion on a front surface of the first plate-shaped member,
a side wall of the second sub passage portion on a back surface of the first plate-shaped member, and
a side wall of the third sub passage portion at a position offset from the back surface in a direction opposite to a direction in which the front surface side faces,
in the second plate-shaped member, there are formed a side wall facing the side wall formed in the first sub passage portion, and a side wall of the third sub passage portion facing the side wall of the third sub passage portion formed in the first plate-shaped member with the plate-shaped circuit board in between, and in the third plate-shaped member, there is formed a side wall facing the side wall formed in the second sub passage portion.

7. The thermal type flow measuring device according to claim 1, wherein the first sub passage portion is formed in a roundabout shape curving not less than 100 degrees with no intersection and provided on the front surface side of the plate-shaped member.

8. The thermal type flow measuring device according to claim 1, wherein a continuous joined shape of the first, second, and third sub passage portions winds not less than 360 degrees.

9. A thermal type flow measuring device comprising:

a sub passage which takes in a portion of a fluid flowing through a main passage; and a sensor element disposed in the sub passage to thereby detect a flow rate of the portion of the fluid, wherein the sub passage has a first sub passage portion formed so as to curve with no intersection, a second sub passage portion formed so as to curve with no intersection, and a third sub passage portion provided between the first sub passage portion and the second sub passage portion, the first sub passage portion and the second sub passage portion are configured so as to form layers on both sides of a separation wall, respectively, the third sub passage portion has a linear passage portion, the linear passage portion of the third sub passage portion is formed so that a cross section thereof extends within a range across both sides of the separation wall in a direction perpendicular to a wall surface of the separation wall, the cross section being taken along a direction perpendicular to a flow direction of a fluid flowing through the linear passage portion, the separation wall separating the layer of the first sub passage portion and the layer of the second sub passage portion from each other, a first communication passage portion which allows the first sub passage portion to communicate with the third sub passage portion curves to make a directional change and connects a passage wall surface of the first sub passage portion to a side wall of the third sub passage portion by an inclined surface, the passage wall surface being defined by the separation wall, the side wall being located on a side of the second sub passage portion with respect to the separation wall, a through passage which passes through the separation wall is provided in a second communication passage portion which allows the second sub passage portion to communicate with the third sub passage portion, and the sensor element is disposed in the third sub passage portion.

10. The thermal type flow measuring device according to claim 9, further comprising:

a housing member including portions of the first sub passage portion, the second sub passage portion, the third sub passage portion, the first communication passage portion, and the second communication passage portion;

a base member including portions of the first sub passage portion, the third sub passage portion, the first communication passage portion, and the second communication passage portion; and a cover member including portions of the second sub passage portion and the second communication passage portion, wherein the base member is joined to one surface of the housing member and the cover member is jointed to the other surface of the housing member, so that a sub passage is assembled, the sub passage having the first sub passage portion, the second sub passage portion, the third sub passage portion, the first communication passage portion, and the second communication passage portion.

11. The thermal type flow measuring device according to claim 10, wherein each of the housing member, the base member, and the cover member is formed of a resin molded member.

12. The thermal type flow measuring device according to claim 9, wherein the sensor element is mounted on a plate-shaped circuit board, and the circuit board is disposed so that the sensor element is located in the linear passage portion of the third sub passage portion.

13. The thermal type flow measuring device according to claim 10, wherein the sensor element is mounted on a plate-shaped circuit board, the circuit board is disposed so that the sensor element is located at the linear passage portion of the third sub passage portion, and an opposite surface of the circuit board to a surface thereof on which the sensor element is mounted is fixed to the base member.

14. The thermal type flow measuring device according to claim 13, wherein the third sub passage portion has a first projecting portion formed in the housing member, and a second projecting portion formed in the base member, the first projecting portion faces a surface of the sensor element, and the second projecting portion faces the opposite surface of the circuit board to the surface thereof on which the sensor element is mounted.

15. The thermal type flow measuring device according to claim 14, wherein a sectional area of a passage formed between the first projecting portion and the surface of the circuit board on which the sensor element is mounted is smaller than a sectional area of a passage formed between the second projecting portion and the opposite surface of the circuit board to the surface thereof on which the sensor element is mounted, both of the sectional areas being taken along the direction perpendicular to the flow direction of the fluid.

16. The thermal type flow measuring device according to claim 9, wherein the first sub passage portion has an inlet opening plane perpendicular to a flow direction of a main fluid, the second sub passage portion has an outlet opening plane perpendicular to the flow direction of the main fluid, and a sub passage from the inlet opening plane to the outlet opening plane curves not less than 360 degrees to make a directional change.

17. The thermal type flow measuring device according to claim 16, wherein the outlet opening plane is located closer to the inlet opening plane than a downstream end surface of the housing member is, the downstream end surface being downstream in the flow direction of the main fluid.

18. The thermal type flow measuring device according to claim 16, wherein in the first sub passage portion, a jagged shape is formed at least on a wall surface in a range of projection from the inlet opening plane.

19. The thermal type flow measuring device according to claim 18, wherein the jagged shape has at least one surface which forms an angle less than 90 degrees with a direction of the fluid.

20. The thermal type flow measuring device according to claim 18, wherein a foreign matter contained in a fluid having entered the first sub passage portion collides with the jagged shapes at least twice, and then is contained again in the fluid in the first sub passage portion.

21. The thermal type flow measuring device according to claim 18, wherein in resin molding of a member constituting the first sub passage portion, the jagged shape is formed with a metallic mold that is subjected to satin-like finish.

* * * * *